United States Patent
Ohtake

(10) Patent No.: US 12,529,874 B2
(45) Date of Patent: Jan. 20, 2026

(54) OPTICAL SYSTEM, OPTICAL APPARATUS, AND METHOD FOR MANUFACTURING OPTICAL SYSTEM

(71) Applicant: Nikon Corporation, Tokyo (JP)

(72) Inventor: Fumiaki Ohtake, Tokyo (JP)

(73) Assignee: Nikon Corporation, Tokyo (JP)

(*) Notice: Subject to any disclaimer, the term of this patent is extended or adjusted under 35 U.S.C. 154(b) by 779 days.

(21) Appl. No.: 17/772,503

(22) PCT Filed: Nov. 24, 2020

(86) PCT No.: PCT/JP2020/043565
§ 371 (c)(1),
(2) Date: Apr. 27, 2022

(87) PCT Pub. No.: WO2021/124804
PCT Pub. Date: Jun. 24, 2021

(65) Prior Publication Data
US 2022/0382026 A1    Dec. 1, 2022

(30) Foreign Application Priority Data

Dec. 20, 2019   (JP) .................. 2019-230038

(51) Int. Cl.
  *G02B 15/14*   (2006.01)
  *G02B 5/18*    (2006.01)
  *G03B 5/00*    (2021.01)
(52) U.S. Cl.
  CPC ....... *G02B 15/1461* (2019.08); *G02B 5/1814* (2013.01); *G03B 5/00* (2013.01)
(58) Field of Classification Search
  CPC ............. G02B 5/1814; G02B 27/0012; G02B 27/0037; G02B 15/142; G02B 15/163; G02B 15/22; G03B 5/00

(Continued)

(56) References Cited

U.S. PATENT DOCUMENTS

| 6,172,818 B1 | 1/2001 | Sakamoto |
| 2002/0063969 A1 | 5/2002 | Hamano et al. |

(Continued)

FOREIGN PATENT DOCUMENTS

| JP | H10148757 A | * | 6/1998 |
| JP | 2000-009999 A |   | 1/2000 |

(Continued)

OTHER PUBLICATIONS

International Search Report from International Patent Application No. PCT/JP2020/043565, Dec. 28, 2020.

(Continued)

*Primary Examiner* — William R Alexander
*Assistant Examiner* — Alaina Marie Swanson
(74) *Attorney, Agent, or Firm* — Potomac Law Group, PLLC

(57) ABSTRACT

An optical system having high optical performance, an optical apparatus including the optical system, and a method for manufacturing the optical system are provided. An optical system used for an optical apparatus such as a camera includes a front lens group including a diffraction lens having a diffraction surface, and a rear lens group disposed on an image side of the front lens group. The optical system is configured so that an interval between the lens groups changes at magnification change. The optical system is also configured so that a condition expressed by a predetermined conditional expression is satisfied.

17 Claims, 10 Drawing Sheets

(58) Field of Classification Search
USPC .......................................................... 359/676
See application file for complete search history.

(56) References Cited

U.S. PATENT DOCUMENTS

| | | |
|---|---|---|
| 2002/0163736 A1 | 11/2002 | Endo |
| 2002/0176058 A1* | 11/2002 | Yasui ................. G02B 15/1465 |
| | | 353/100 |
| 2005/0275949 A1 | 12/2005 | Fujimoto et al. |
| 2006/0203356 A1 | 9/2006 | Fujimoto et al. |
| 2018/0172958 A1* | 6/2018 | Kawamura .............. G03B 5/00 |
| 2021/0191112 A1 | 6/2021 | Yamashita et al. |

FOREIGN PATENT DOCUMENTS

| | | | |
|---|---|---|---|
| JP | 2002-107624 A | 4/2002 | |
| JP | 2002-131641 A | 5/2002 | |
| JP | 2002-244044 A | 8/2002 | |
| JP | 2005-352057 A | 12/2005 | |
| JP | 2015232674 A * | 12/2015 | |
| JP | 2016-080877 A | 5/2016 | |
| JP | 2019-132919 A | 8/2019 | |
| WO | WO-2018021459 A1 * | 2/2018 | ............ G02B 13/02 |
| WO | WO 2019/116569 A1 | 6/2019 | |

OTHER PUBLICATIONS

Office Action issued Mar. 28, 2023, in Japanese Patent Application No. 2021-565402.

Office Action issued Nov. 4, 2022, in Japanese Patent Application No. 2021-565402.

Office Action issued Mar. 27, 2023, in Chinese Patent Application No. 202080078047.3.

International Preliminary Report on Patentability from International Patent Application No. PCT/JP2020/043565, May 17, 2022.

* cited by examiner

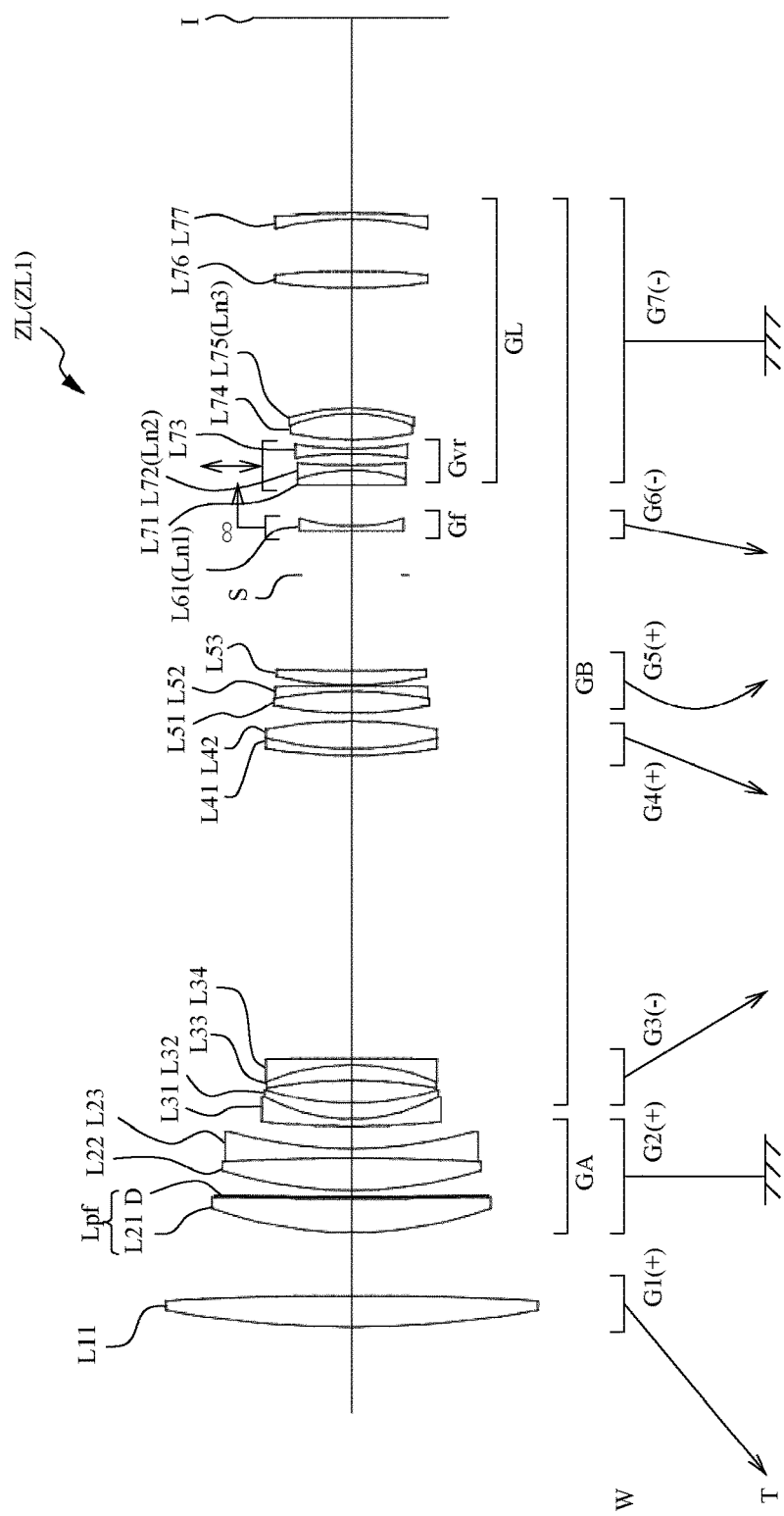
[Fig. 1]

[Fig.2]
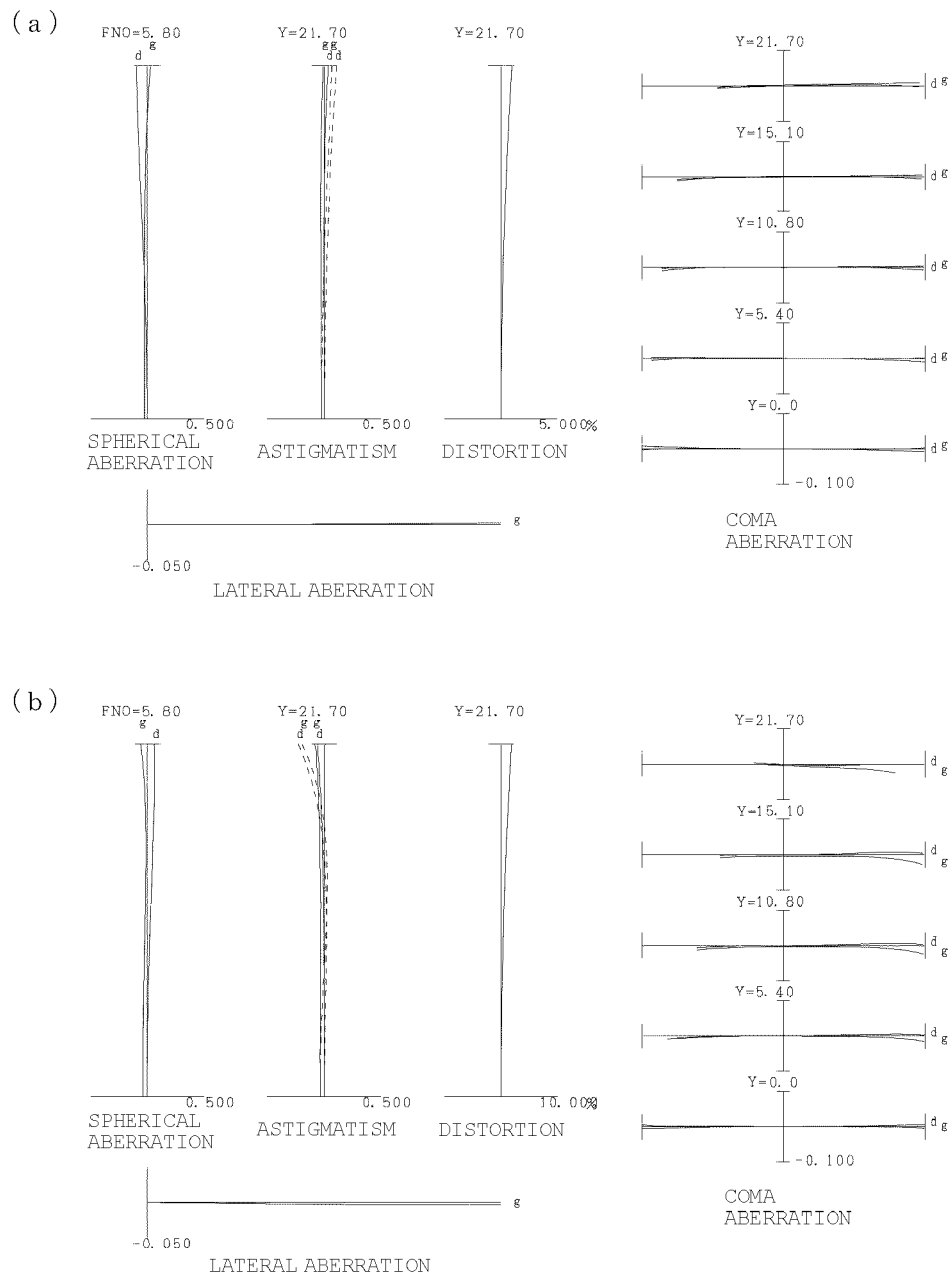

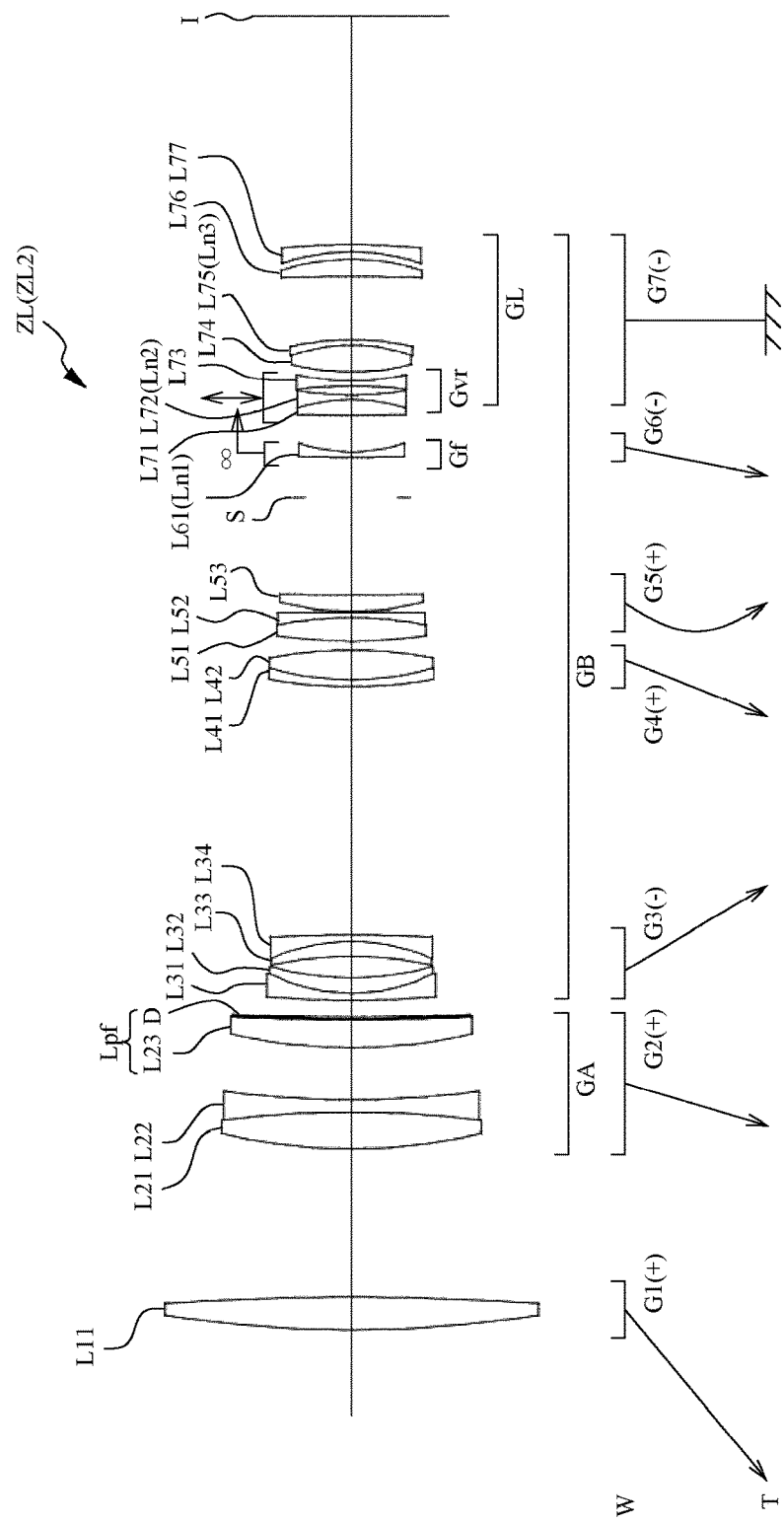
[Fig. 3]

[Fig.4]
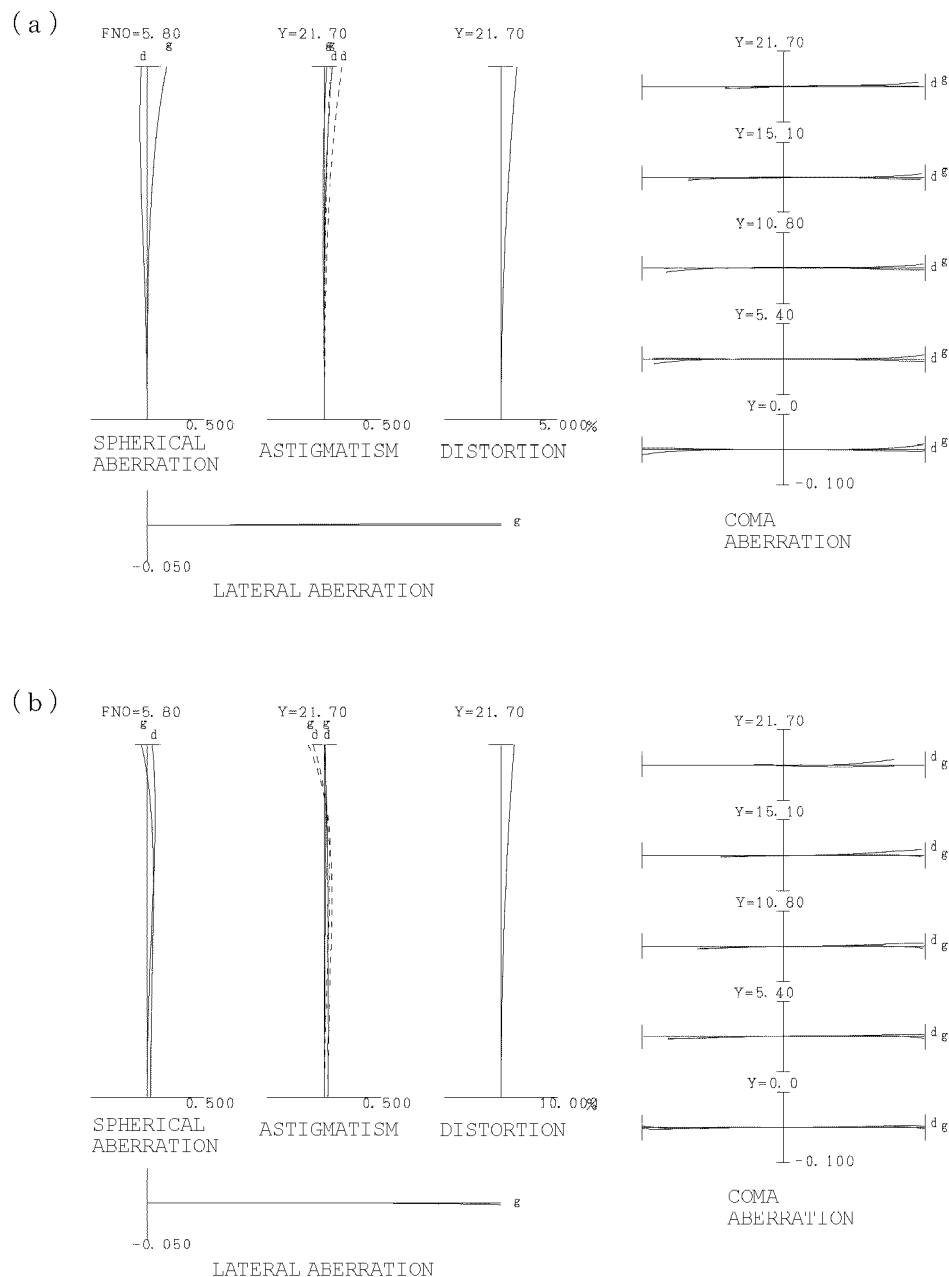

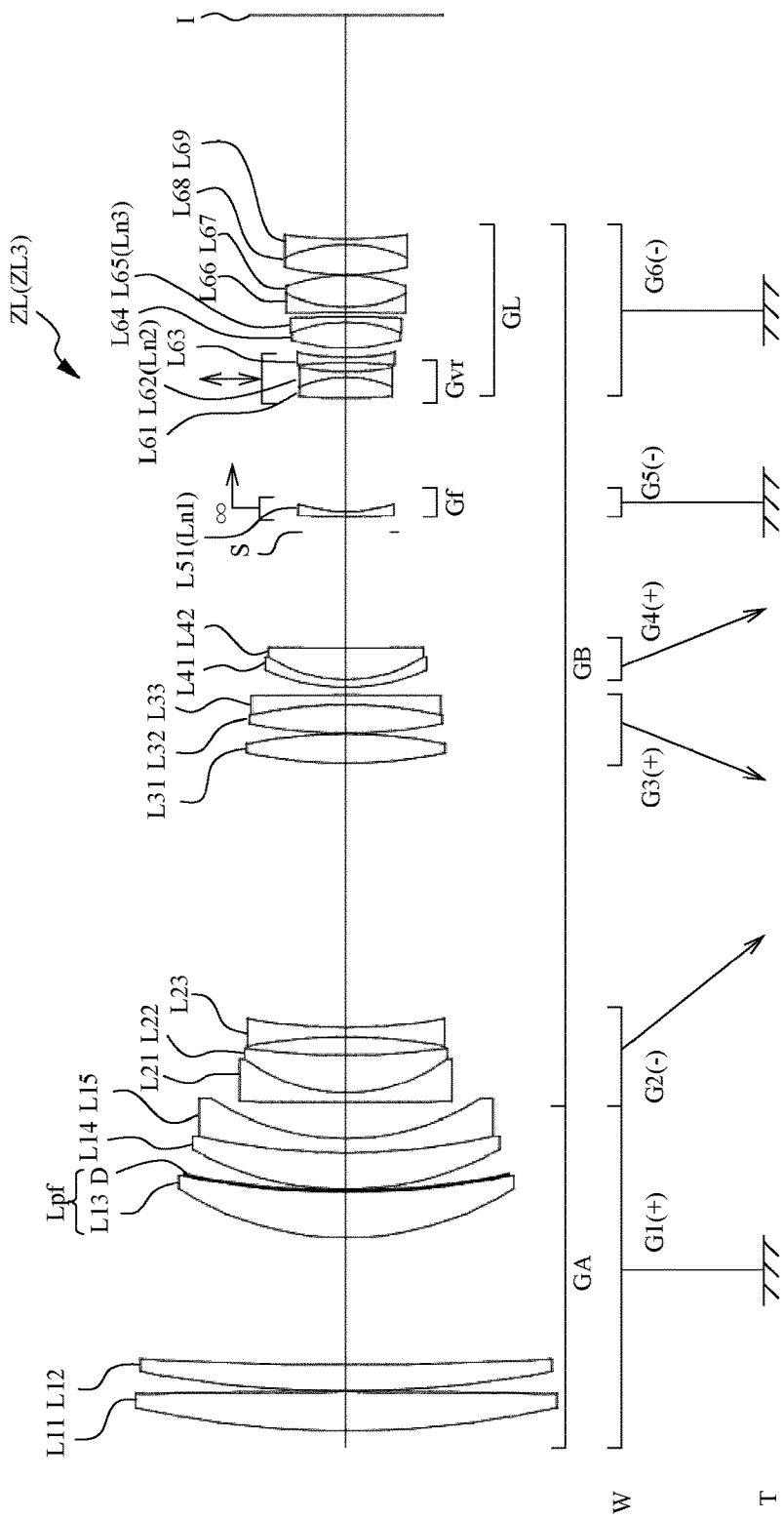
[Fig. 5]

[Fig.6]
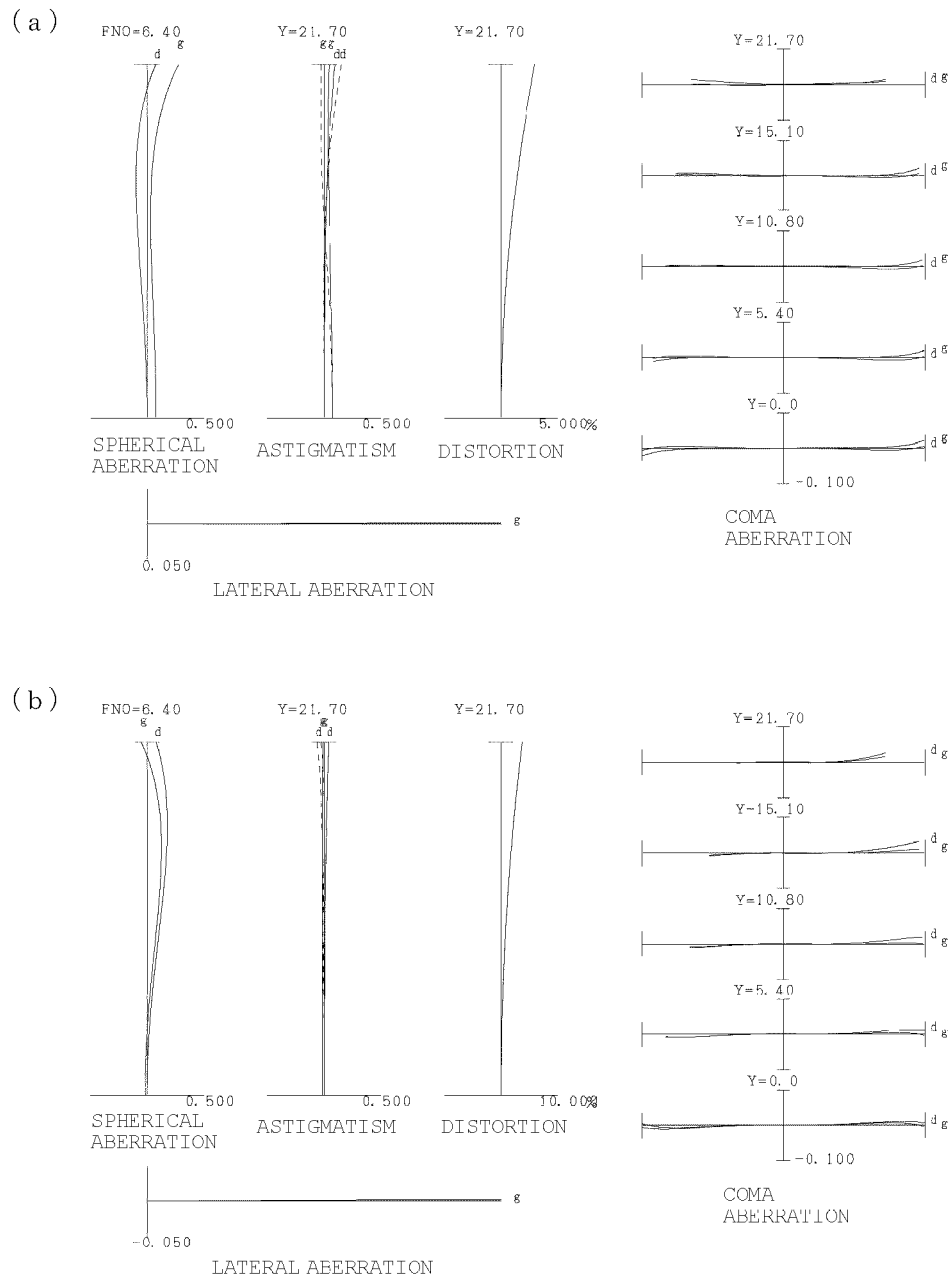

[Fig.7]
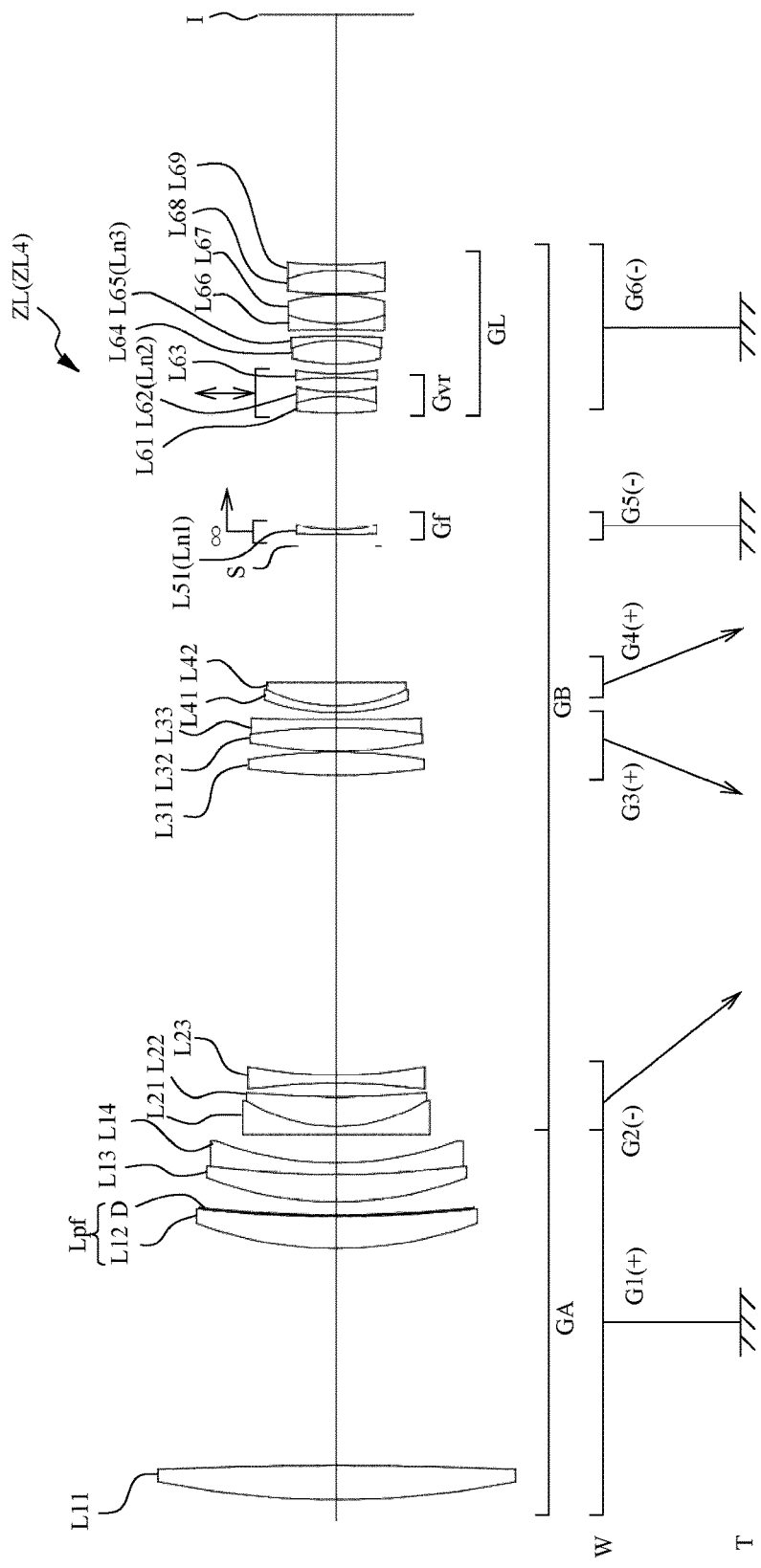

[Fig.8]
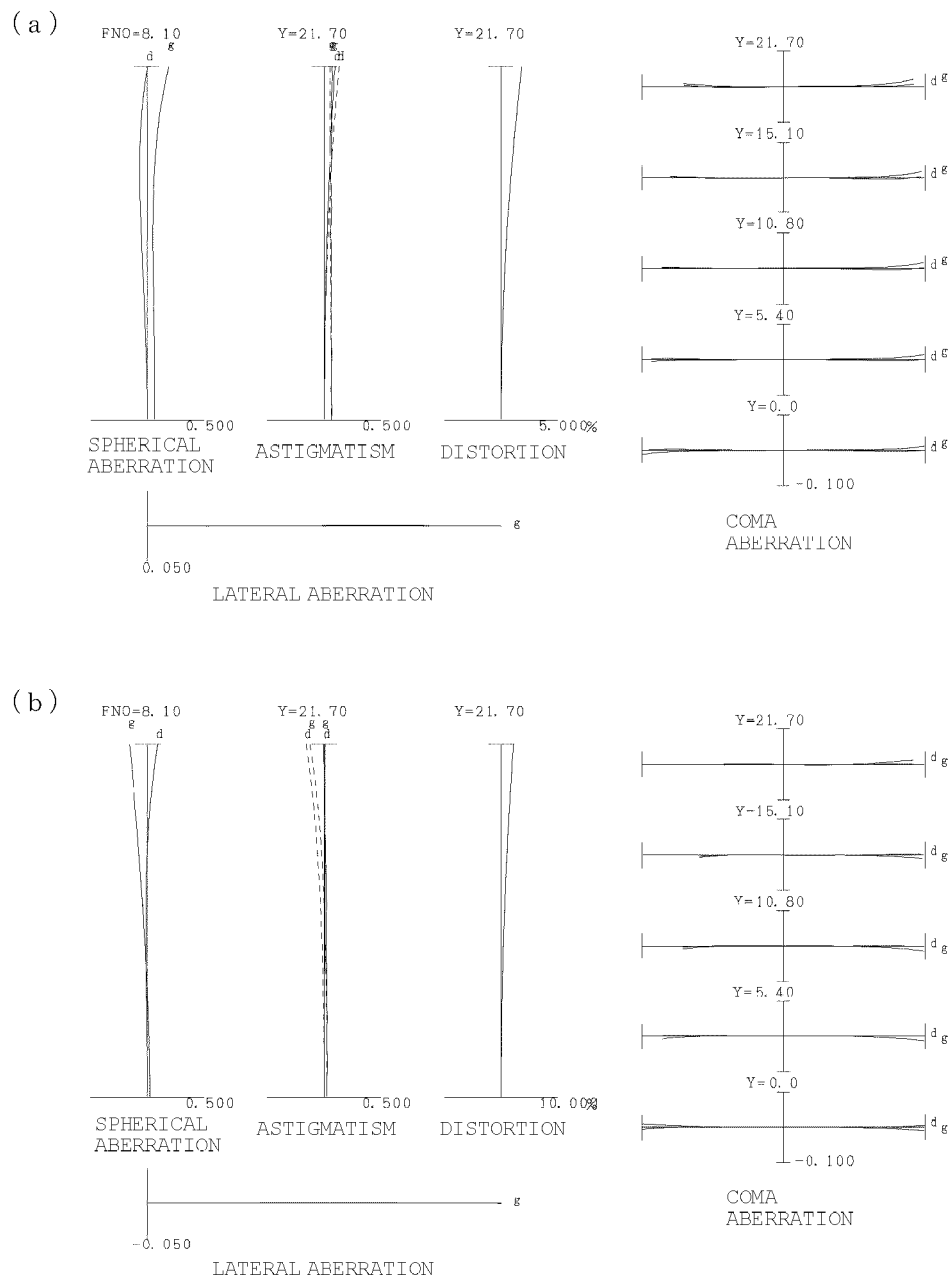

[Fig.9]
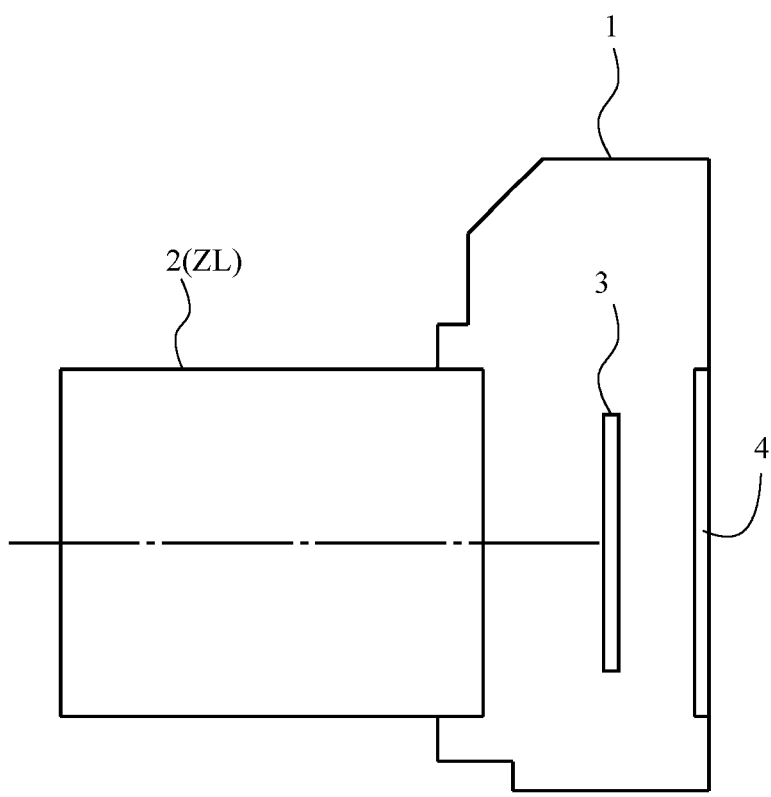

[Fig.10]
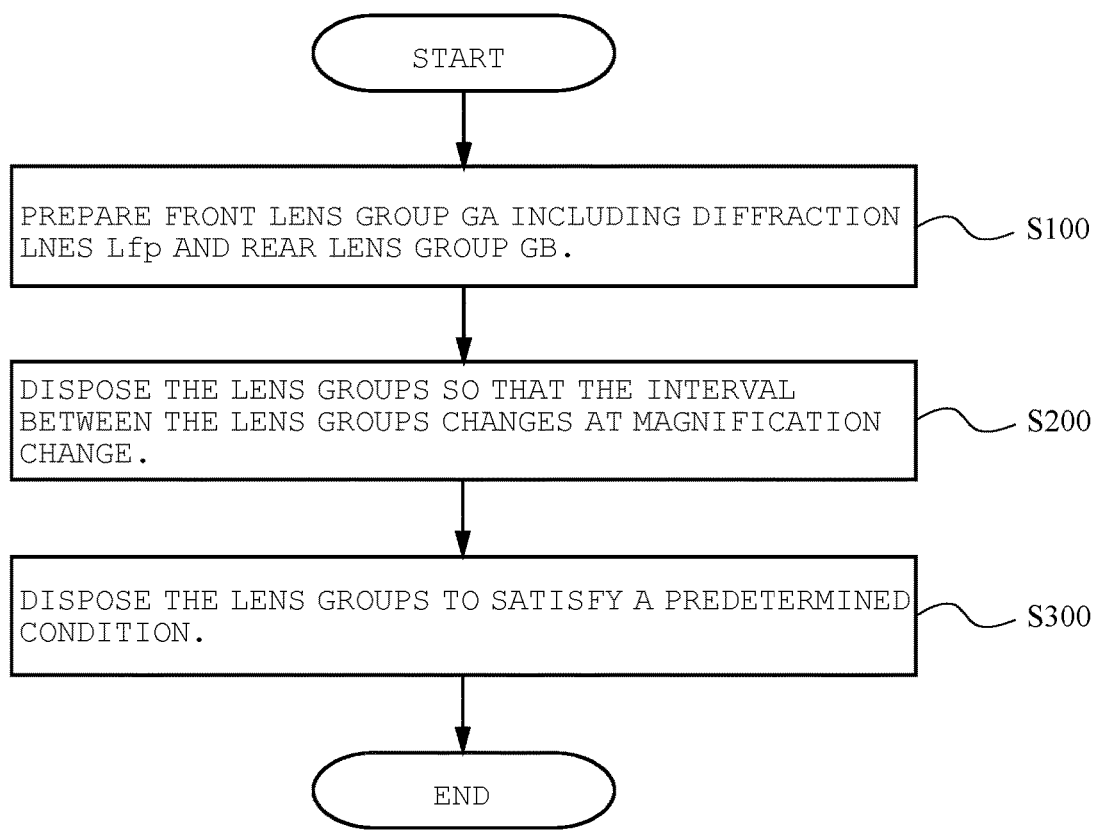

OPTICAL SYSTEM, OPTICAL APPARATUS, AND METHOD FOR MANUFACTURING OPTICAL SYSTEM

TECHNICAL FIELD

The present invention relates to an optical system, an optical apparatus, and a method for manufacturing the optical system.

BACKGROUND ART

It has been conventionally known that an achromatic effect is obtained by providing a diffraction surface in an optical system (refer to Patent Literature 1, for example). In particular, in a telephoto lens, a larger achromatic effect can be exerted by disposing the diffraction surface as close to a front side (object side) as possible in a lens group, and accordingly, the total length and weight of the optical system can be reduced. However, when strong light from outside an image capturing screen is incident on the diffraction surface, diffracted light thereof potentially becomes flare and decreases the entire screen contrast. Thus, it is required to dispose the diffraction surface at an appropriate position where the achromatic effect can be sufficiently exerted and contrast decrease due to flare can be reduced.

CITATION LIST

Patent Literature

Patent Literature 1: Japanese Patent Laid-Open No. 2005-352057

SUMMARY OF INVENTION

An optical system according to a first aspect of the present invention includes: a front lens group including a diffraction lens having a diffraction surface; and a rear lens group disposed on an image side of the front lens group, a distance between lens groups changes at magnification change, and a condition expressed by an expression below is satisfied:

$$0.130 < TLpf/TLt < 0.500$$

in the expression,

TLt: total length of the optical system in a telescopic state, and

TLpf: distance on an optical axis from a lens surface closest to an object side in the optical system to the diffraction surface in the telescopic state.

A method for manufacturing the optical system according to the first aspect of the present invention is a method for manufacturing an optical system including a front lens group and a rear lens group, the front lens group including a diffraction lens having a diffraction surface, the rear lens group being disposed on an image side of the front lens group, the method including disposing lens groups so that a distance between the lens groups changes at magnification change; and disposing the lens groups so that a condition expressed by an expression below is satisfied:

$$0.130 < TLpf/TLt < 0.500$$

in the expression,

TLt: total length of the optical system in the telescopic state, and

TLpf: distance on an optical axis from a lens surface closest to the object side in the optical system to the diffraction surface in the telescopic state.

BRIEF DESCRIPTION OF DRAWINGS

FIG. 1 is a cross-sectional view showing a lens configuration of an optical system according to a first example.

FIG. 2 shows a variety of aberration diagrams of the optical system according to the first example: (a) shows a wide-angle state; and (b) shows a telescopic state.

FIG. 3 is a cross-sectional view showing a lens configuration of an optical system according to a second example.

FIG. 4 shows a variety of aberration diagrams of the optical system according to the second example: (a) shows a wide-angle state; and (b) shows a telescopic state.

FIG. 5 is a cross-sectional view showing a lens configuration of an optical system according to a third example.

FIG. 6 shows a variety of aberration diagrams of the optical system according to the third example: (a) shows a wide-angle state; and (b) shows a telescopic state.

FIG. 7 is a cross-sectional view showing a lens configuration of an optical system according to a fourth example.

FIG. 8 shows a variety of aberration diagrams of the optical system according to the fourth example: (a) shows a wide-angle state; and (b) shows a telescopic state.

FIG. 9 shows a cross-sectional view of a camera on which the above-described optical system is mounted.

FIG. 10 is a flowchart for description of a method for manufacturing the above-described optical system.

DESCRIPTION OF EMBODIMENTS

Preferable embodiments will be described below with reference to the drawings.

As shown in FIG. 1, an optical system ZL according to the present embodiment includes a front lens group GA including a diffraction lens Lpf having a diffraction surface D, and a rear lens group GB disposed on an image side of the front lens group GA, and an interval between the lens groups changes at magnification change. With the diffraction surface D, it is possible to obtain an optical system in which a variety of aberrations, in particular, chromatic aberration is favorably corrected.

The optical system ZL according to the present embodiment desirably satisfies Conditional Expression (1) described below.

$$0.130 < TLpf/TLt < 0.500 \qquad (1)$$

In the expression,

TLt: total length of the optical system ZL in a telescopic state, and

TLpf: distance on an optical axis from a lens surface closest to an object side in the optical system ZL to the diffraction surface D in the telescopic state.

Conditional Expression (1) defines the ratio of the distance on the optical axis from the lens surface closest to the object side to the diffraction surface D relative to the total length of the optical system ZL in the telescopic state. When Conditional Expression (1) is satisfied, the diffraction surface D is disposed at an appropriate position, and thus it is possible to favorably correct a variety of aberrations such as longitudinal chromatic aberration. When the lower limit of Conditional Expression (1) is exceeded, that is, the diffraction surface D is disposed on the object side of the optical system ZL, flare occurs to the entire screen when a light source is positioned near an end of an angle of view, and hence this is undesirable. Meanwhile, it is possible to secure the advantageous effect of the present embodiment more surely by setting the lower limit value of Conditional Expression (1) to 0.140. Further, in order to secure the advantageous effect of the present embodiment further more surely, it is preferable to set the lower limit value of Conditional Expression (1) to 0.145, 0.150, 0.155, and more preferable to 0.160. When the upper limit of Conditional Expression (1) is exceeded, an achromatic effect provided by the diffraction surface D undesirably decreases. Meanwhile, it is possible to secure the advantageous effect of the present embodiment more surely by setting the upper limit value of Conditional Expression (1) to 0.480. Further, in order to secure the advantageous effect of the present embodiment further more surely, it is preferable to set the upper limit value of Conditional Expression (1) to 0.460, 0.440, 0.420, and more preferable to 0.400.

The optical system ZL according to the present embodiment desirably satisfies Conditional Expression (2) described below.

$$Bfw/fw<0.90 \qquad (2)$$

In the expression,
fw: overall focal length of the optical system ZL in a wide-angle state, and
Bfw: back focus of the optical system ZL in the wide-angle state.

Conditional Expression (2) defines the ratio of the back focus relative to the overall focal length of the optical system ZL in the wide-angle state. When Conditional Expression (2) is satisfied, it is possible to achieve both size reduction and favorable aberration correction. When the upper limit of Conditional Expression (2) is exceeded, the back focus is undesirably too long, which makes it difficult to achieve size reduction of the present optical system ZL. Meanwhile, it is possible to secure the advantageous effect of the present embodiment more surely by setting the upper limit value of Conditional Expression (2) to 0.80. Further, in order to secure the advantageous effect of the present embodiment further more surely, it is preferable to set the upper limit value of Conditional Expression (2) to 0.60, 0.50, 0.40, and more preferable to 0.30. When the lower limit of Conditional Expression (2) is exceeded, a large-diameter lens is undesirably disposed near an image plane, which unnecessarily makes the optical system heavier. Meanwhile, it is possible to secure the advantageous effect of the present embodiment more surely by setting the lower limit value of Conditional Expression (2) to 0.05. Further, in order to secure the advantageous effect of the present embodiment further more surely, it is preferable to set the lower limit value of Conditional Expression (2) to 0.10, 0.12, 0.14, and more preferable to 0.16.

The optical system ZL according to the present embodiment desirably satisfies Conditional Expression (3) described below.

$$0.50<f1/fw<5.00 \qquad (3)$$

In the expression,
fw: overall focal length of the optical system ZL in the wide-angle state, and
f1: focal length of a lens group disposed closest to the object side in the optical system ZL.

Conditional Expression (3) defines the ratio of the focal length of the lens group (hereinafter referred to as a "first lens group G1") disposed closest to the object side in the optical system ZL relative to the overall focal length of the optical system ZL in the wide-angle state. When Conditional Expression (3) is satisfied, it is possible to appropriately define refractive power (power) of the first lens group G1, and it is possible to achieve size reduction and favorable optical performance of the optical system ZL. When the upper limit of Conditional Expression (3) is exceeded, the refractive power (power) of the first lens group G1 is undesirably too weak, which makes it difficult to correct a variety of aberrations such as astigmatism and leads to length and weight increase of the optical system ZL. Meanwhile, it is possible to secure the advantageous effect of the present embodiment more surely by setting the upper limit value of Conditional Expression (3) to 4.00. Further, in order to secure the advantageous effect of the present embodiment further more surely, it is preferable to set the upper limit value of Conditional Expression (3) to 3.50, 3.00, 2.50, and more preferable to 2.00. When the lower limit of Conditional Expression (3) is exceeded, the refractive power (power) of the first lens group G1 is undesirably too strong, which prevents favorable aberration correction. Meanwhile, it is possible to secure the advantageous effect of the present embodiment more surely by setting the lower limit value of Conditional Expression (3) to 0.55. Further, in order to secure the advantageous effect of the present embodiment further more surely, it is preferable to set the lower limit value of Conditional Expression (3) to 0.60, 0.65, 0.70, and more preferable to 0.75.

The optical system ZL according to the present embodiment desirably satisfies Conditional Expression (4) described below.

$$0.20<f1/ft<2.00 \qquad (4)$$

In the expression,
ft: overall focal length of the optical system ZL in the telescopic state, and
f1: focal length of the lens group disposed closest to the object side in the optical system ZL.

Conditional Expression (4) defines the ratio of the focal length of the lens group (first lens group G1) disposed closest to the object side in the optical system ZL relative to the overall focal length of the optical system ZL in the telescopic state. When Conditional Expression (4) is satisfied, it is possible to appropriately define the refractive power (power) of the first lens group G1, and it is possible to achieve size reduction and favorable optical performance of the optical system ZL. When the upper limit of Conditional Expression (4) is exceeded, the refractive power (power) of the first lens group G1 is undesirably too weak, which makes it difficult to correct a variety of aberrations such as astigmatism and leads to length and weight increase of the optical system ZL. Meanwhile, it is possible to secure the advantageous effect of the present embodiment more surely by setting the upper limit value of Conditional Expression (4) to 1.75. Further, in order to secure the advantageous effect of the present embodiment further more surely, it is preferable to set the upper limit value of Conditional Expression (4) to 1.50, 1.25, 1.00, and more preferable to 0.85. When the lower limit of Conditional Expression (4) is exceeded, the refractive power (power) of the first lens group G1 is undesirably too strong, which prevents favorable aberration correction. Meanwhile, it is possible to secure the advantageous effect of the present embodiment more surely by setting the lower limit value of Conditional Expression (4) to 0.24. Further, in order to secure the advantageous effect of the present embodiment further more surely, it is preferable to set the lower limit value of Conditional Expression (4) to 0.28, 0.32, 0.36, and more preferable to 0.38.

The optical system ZL according to the present embodiment desirably satisfies Conditional Expression (5) described below.

$$0.30<f1/fL1<1.50 \qquad (5)$$

In the expression,
fL1: focal length of a lens disposed closest to the object side in the optical system ZL, and
f1: focal length of the lens group disposed closest to the object side in the optical system ZL.

Conditional Expression (5) defines the ratio of the focal length of the lens group (first lens group G1) disposed closest to the object side in the optical system ZL relative to the focal length of the lens (hereinafter referred to as a "first lens L11") disposed closest to the object side in the optical system ZL. When Conditional Expression (5) is satisfied, in other words, the first lens L11 is a lens having positive refractive power, it is possible to achieve ray height decrease and lens weight reduction, and it is possible to favorably correct a variety of aberrations such as astigmatism. When the upper limit of Conditional Expression (5) is exceeded, the refractive power of the first lens L11 is undesirably too strong, which prevents favorable aberration correction. Meanwhile, it is possible to secure the advantageous effect of the present embodiment more surely by setting the upper limit value of Conditional Expression (5) to 1.40. Further, in order to secure the advantageous effect of the present embodiment further more surely, it is preferable to set the upper limit value of Conditional Expression (5) to 1.30, 1.20, 1.10, and more preferable to 1.05. When the lower limit of Conditional Expression (5) is exceeded, the refractive index of the first lens L11 is undesirably too low, which leads to diameter increase of a second lens or any following lens and lens weight increase. Meanwhile, it is possible to secure the advantageous effect of the present embodiment more surely by setting the lower limit value of Conditional Expression (5) to 0.35. Further, in order to secure the advantageous effect of the present embodiment further more surely, it is preferable to set the lower limit value of Conditional Expression (5) to 0.40, 0.45, 0.50, and more preferable to 0.55.

The optical system ZL according to the present embodiment desirably satisfies Conditional Expression (6) described below.

$$0.40 < TLt/ft < 1.00 \quad (6)$$

In the expression,
ft: overall focal length of the optical system ZL in the telescopic state, and
TLt: total length of the optical system ZL in the telescopic state.

Conditional Expression (6) defines the ratio of the total length relative to the overall focal length of the optical system ZL in the telescopic state. When Conditional Expression (6) is satisfied, it is possible to define the total length of the optical system ZL in the telescopic state, and accordingly, it is possible to achieve both size reduction and high performance of the optical system ZL. When the upper limit of Conditional Expression (6) is exceeded, it is difficult to favorably correct a variety of aberrations such as curvature of field and distortion and the size of the optical system ZL undesirably increases. Meanwhile, it is possible to secure the advantageous effect of the present embodiment more surely by setting the upper limit value of Conditional Expression (6) to 0.96. Further, in order to secure the advantageous effect of the present embodiment further more surely, it is preferable to set the upper limit value of Conditional Expression (6) to 0.92, 0.88, 0.84, and more preferable to 0.80. When the lower limit of Conditional Expression (6) is exceeded, it is undesirably impossible to favorably correct a variety of aberrations such as spherical aberration. Meanwhile, it is possible to secure the advantageous effect of the present embodiment more surely by setting the lower limit value of Conditional Expression (6) to 0.44. Further, in order to secure the advantageous effect of the present embodiment further more surely, it is preferable to set the lower limit value of Conditional Expression (6) to 0.48, 0.50, 0.52, and more preferable to 0.54.

The optical system ZL according to the present embodiment desirably includes an aperture stop S and satisfies Conditional Expression (7) described below.

$$0.10 < (-fImt)/fObt < 0.60 \quad (7)$$

In the expression,
fObt: combined focal length on the object side of the aperture stop S of the optical system ZL in the telescopic state, and
fImt: combined focal length on the image side of the aperture stop S of the optical system ZL in the telescopic state.

Conditional Expression (7) defines the ratio of the combined focal length on the image side of the aperture stop S relative to the combined focal length on the object side of the aperture stop S of the optical system ZL in the telescopic state. When Conditional Expression (7) is satisfied, it is possible to define appropriate refractive power (power) disposition on both sides of the aperture stop S, and accordingly, it is possible to achieve both size reduction and high performance of the optical system ZL. When the upper limit of Conditional Expression (7) is exceeded, it is difficult to favorably correct a variety of aberrations such as curvature of field and distortion and the size of the optical system ZL undesirably increases. Meanwhile, it is possible to secure the advantageous effect of the present embodiment more surely by setting the upper limit value of Conditional Expression (7) to 0.58. Further, in order to secure the advantageous effect of the present embodiment further more surely, it is preferable to set the upper limit value of Conditional Expression (7) to 0.54, 0.50, 0.46, and more preferable to 0.42. When the lower limit of Conditional Expression (7) is exceeded, it is undesirably impossible to favorably correct coma aberration, lateral chromatic aberration, and the like. Meanwhile, it is possible to secure the advantageous effect of the present embodiment more surely by setting the lower limit value of Conditional Expression (7) to 0.12. Further, in order to secure the advantageous effect of the present embodiment further more surely, it is preferable to set the lower limit value of Conditional Expression (7) to 0.14, 0.16, 0.18, and more preferable to 0.20.

The optical system ZL according to the present embodiment desirably includes a focusing lens group Gf configured to move in an optical axis direction at focusing, and the focusing lens group Gf desirably includes at least one negative lens (hereinafter referred to as a "first specific negative lens Ln1") that satisfies Conditional Expression (8) described below.

$$60.00 < vdF \quad (8)$$

In the expression,
vdF: Abbe number of the medium of the first specific negative lens Ln1 of the focusing lens group Gf at a d line.

Conditional Expression (8) defines the Abbe number of the medium of the first specific negative lens Ln1 included in the focusing lens group Gf at the d line. When Conditional Expression (8) is satisfied, it is possible to achieve both favorable close-distance performance (optical performance at focusing upon an object at a close distance) and light-weight and high-speed focusing. When the lower limit of Conditional Expression (8) is exceeded, close-distance variation of chromatic aberration is undesirably large. Meanwhile, it is possible to secure the advantageous effect of the present embodiment more surely by setting the lower limit value of Conditional Expression (8) to 63.00. Further, in order to secure the advantageous effect of the present embodiment further more surely, it is preferable to set the lower limit value of Conditional Expression (8) to 69.00, 72.00, 74.00, and more preferable to 82.00.

The optical system ZL according to the present embodiment desirably satisfies Conditional Expression (9) described below.

$$0.200 < fLPF/ft < 1.000 \tag{9}$$

In the expression,
ft: overall focal length of the optical system ZL in the telescopic state, and
fLPF: focal length of the diffraction lens Lpf.

Conditional Expression (9) defines the ratio of the focal length of the diffraction lens Lpf relative to the overall focal length of the optical system ZL in the telescopic state. When Conditional Expression (9) is satisfied, it is possible to appropriately define the refractive power (power) of the diffraction lens Lpf, and accordingly, it is possible to achieve both size reduction and high performance of the optical system ZL. When the upper limit of Conditional Expression (9) is exceeded, the refractive power (power) of the diffraction lens Lpf is undesirably too weak, which leads to size increase of the optical system ZL. Meanwhile, it is possible to secure the advantageous effect of the present embodiment more surely by setting the upper limit value of Conditional Expression (9) to 0.900. Further, in order to secure the advantageous effect of the present embodiment further more surely, it is preferable to set the upper limit value of Conditional Expression (9) to 0.800, 0.750, 0.700, and more preferable to 0.650. When the lower limit of Conditional Expression (9) is exceeded, the refractive power (power) of the diffraction lens Lpf is undesirably too strong, which makes it impossible to favorably correct spherical aberration and the like. Meanwhile, it is possible to secure the advantageous effect of the present embodiment more surely by setting the lower limit value of Conditional Expression (9) to 0.240. Further, in order to secure the advantageous effect of the present embodiment further more surely, it is preferable to set the lower limit value of Conditional Expression (9) to 0.270, 0.300, 0.320, and more preferable to 0.350.

The optical system ZL according to the present embodiment desirably satisfies Conditional Expression (10) described below.

$$0.100 < fLPF/fA < 2.000 \tag{10}$$

In the expression,
fA: focal length of the front lens group GA, and
fLPF: focal length of the diffraction lens Lpf.

Conditional Expression (10) defines the ratio of the focal length of the diffraction lens Lpf relative to the focal length of the front lens group GA including the diffraction lens Lpf. When Conditional Expression (10) is satisfied, it is possible to achieve both size reduction and high performance of the optical system ZL. When the upper limit of Conditional Expression (10) is exceeded, the refractive power (power) of the diffraction lens Lpf is undesirably too weak, which leads to size increase of the optical system ZL. Meanwhile, it is possible to secure the advantageous effect of the present embodiment more surely by setting the upper limit value of Conditional Expression (10) to 1.800. Further, in order to secure the advantageous effect of the present embodiment further more surely, it is preferable to set the upper limit value of Conditional Expression (10) to 1.600, 1.400, 1.200, and more preferable to 1.100. When the lower limit of Conditional Expression (10) is exceeded, the refractive power (power) of the diffraction lens Lpf is undesirably too strong, which makes it impossible to favorably correct spherical aberration and the like. Meanwhile, it is possible to secure the advantageous effect of the present embodiment more surely by setting the lower limit value of Conditional Expression (10) to 0.130. Further, in order to secure the advantageous effect of the present embodiment further more surely, it is preferable to set the lower limit value of Conditional Expression (10) to 0.160, 0.200, 0.250, and more preferable to 0.300.

The optical system ZL according to the present embodiment desirably satisfies Conditional Expression (11) described below. In the following, "E-n" represents "$\times 10^{-n}$".

$$2.0E\text{-}5 < \phi D < 2.0E\text{-}4 \tag{11}$$

In the expression,
$\phi D$: refractive power of the diffraction surface D for a dominant wavelength.

Conditional Expression (11) defines the refractive power of the diffraction surface D of the diffraction lens Lpf for the dominant wavelength. When Conditional Expression (11) is satisfied, it is possible to favorably correct longitudinal chromatic aberration and lateral chromatic aberration. Meanwhile, it is possible to secure the advantageous effect of the present embodiment more surely by setting the upper limit value of Conditional Expression (11) to 1.8E-4. Further, in order to secure the advantageous effect of the present embodiment further more surely, it is preferable to set the upper limit value of Conditional Expression (11) to 1.6E-4, 1.4E-4, 1.2E-4, and more preferable to 1.0E-4. Meanwhile, it is possible to secure the advantageous effect of the present embodiment more surely by setting the lower limit value of Conditional Expression (11) to 3.0E-5. Further, in order to secure the advantageous effect of the present embodiment further more surely, it is preferable to set the lower limit value of Conditional Expression (11) to 4.0E-5, 5.0E-5, 5.5E-5, and more preferable to 6.0E-5.

In the optical system ZL according to the present embodiment, the diffraction surface D is desirably in contact with air. When the diffraction surface D is formed on a bonded surface of a cemented lens, temperature change undesirably occurs due to UV absorption at molding of UV curable resin unless two bonded lenses are both made of glass materials having high UV transmittance, and accordingly, surface accuracy degrades due to thermal stress. However, when glass materials having high UV transmittance are employed to avoid the above-described problem, the number of optical designing constraint is undesirably large, which leads to optical performance decrease.

In the optical system ZL according to the present embodiment, the diffraction surface D is desirably disposed on the object side of the focusing lens group Gf configured to move in the optical axis direction at focusing. With this configuration, it is possible to obtain favorable optical performance for a variety of aberrations such as chromatic aberration. The diffraction surface D is more preferably disposed on the image side of the aperture stop S.

The optical system ZL according to the present embodiment desirably includes a final lens group GL that is closest to the image side and fixed with respect to the image plane at magnification change. With this configuration, it is possible to obtain an optical system that favorably corrects a variety of aberrations such as curvature of field and distortion and is robust against manufacturing error.

In the optical system ZL according to the present embodiment, the rear lens group GB desirably includes an anti-vibration lens group Gvr configured to move with a displacement component in a direction perpendicular to the optical axis, and the anti-vibration lens group Gvr desirably includes at least one negative lens (hereinafter referred to as a "second specific negative lens Ln2") that satisfies Conditional Expression (12) described below.

$$56.00 < vdVR \quad (12)$$

In the expression, vdVR: Abbe number of the medium of the second specific negative lens Ln2 included in the anti-vibration lens group Gvr at the d line.

Conditional Expression (12) defines the Abbe number of the medium of the second specific negative lens Ln2 included in the anti-vibration lens group Gvr at the d line. When Conditional Expression (12) is satisfied, it is possible to obtain the anti-vibration lens group Gvr that favorably corrects a camera shake. When the lower limit of Conditional Expression (12) is exceeded, chromatic aberration undesirably occurs at anti-vibration, which largely degrades optical performance. Meanwhile, it is possible to secure the advantageous effect of the present embodiment more surely by setting the lower limit value of Conditional Expression (12) to 58.00. Further, in order to secure the advantageous effect of the present embodiment further more surely, it is preferable to set the lower limit value of Conditional Expression (12) to 60.00, 63.00, 65.00, and more preferable to 67.00.

In the optical system ZL according to the present embodiment, the rear lens group GB desirably includes at least one negative lens (hereinafter referred to as a "third specific negative lens Ln3") that satisfies Conditional Expression (13) described below.

$$0.655 < \theta gFr + 0.00168 \times vdr \quad (13)$$

In the expression,

θgFr: partial dispersion ratio of the medium of the third specific negative lens Ln3 included in the rear lens group GB, and vdr: Abbe number of the medium of the third specific negative lens Ln3 included in the rear lens group GB at the d line.

The partial dispersion ratio θgF is defined as θgF=(ng−nF)/(nF−nC), where ng represents a refractive index at a g line (λ=435.8 nm), nF represents a refractive index at an F line (λ=486.1 nm), and nC represents a refractive index at a C line (λ=656.3 nm).

Conditional Expression (13) defines the medium of the third specific negative lens Ln3 included in the rear lens group GB. When the third specific negative lens Ln3 that satisfies Conditional Expression (13) is disposed in the rear lens group GB, it is possible to favorably correct lateral chromatic aberration. When the lower limit of Conditional Expression (13) is exceeded, it is impossible to favorably correct lateral chromatic aberration. Meanwhile, it is possible to secure the advantageous effect of the present embodiment more surely by setting the lower limit value of Conditional Expression (13) to 0.656. Further, in order to secure the advantageous effect of the present embodiment further more surely, it is preferable to set the lower limit value of Conditional Expression (13) to 0.657, 0.658, 0.659, and more preferable to 0.660.

The optical system ZL according to the present embodiment desirably satisfies Conditional Expression (14) described below.

$$0.00° < 2\omega w < 24.00° \quad (14)$$

In the expression,

2ωw: full angle of view of the optical system ZL in the wide-angle state.

Conditional Expression (14) defines the full angle of view of the optical system ZL in the wide-angle state. It is possible to set the upper limit value of Conditional Expression (14) to 22.00°. Further, it is preferable to set the upper limit value of Conditional Expression (14) to 20.00°, 18.00°, 16.00°, and more preferable to 13.00°. It is also possible to set the lower limit value of Conditional Expression (14) to 1.00°. Further, it is preferable to set the lower limit value of Conditional Expression (14) to 2.00°, 3.00°, 4.00°, and more preferable to 5.00°.

The optical system ZL according to the present embodiment desirably satisfies Conditional Expression (15) described below.

$$0.00° < 2\omega t < 10.00° \quad (15)$$

In the expression,

2ωt: full angle of view of the optical system ZL in the telescopic state.

Conditional Expression (15) defines the full angle of view of the optical system ZL in the telescopic state. It is possible to set the upper limit value of Conditional Expression (15) to 9.00°. Further, it is preferable to set the upper limit value of Conditional Expression (15) to 8.00°, 7.00°, 6.00°, and more preferable to 5.50°. It is also possible to set the lower limit value of Conditional Expression (15) to 1.00°. Further, it is preferable to set the lower limit value of Conditional Expression (15) to 1.50°, 2.00°, and more preferable to 2.50°.

A camera that is an optical apparatus including the optical system ZL according to the present embodiment will be described below with reference to FIG. 9. This camera 1 is what is called a mirrorless camera that allows lens exchange and includes the optical system ZL according to the present embodiment as an image pickup lens 2. In the present camera 1, light from an object (subject) that is not shown is collected by the image pickup lens 2 to form a subject image on an image capturing plane of an image unit 3 via an optical low pass filter (OLPF) that is not shown. A photoelectric converter provided in the image unit 3 photoelectrically converts the subject image into an electrical form. An image of the subject is thus produced. The image is displayed on an electronic view finder (EVF) 4 provided on the camera 1. A photographer can thus observe the subject on the EVF 4.

When the photographer presses a release button that is not shown, the image photoelectrically converted by the image unit 3 is stored in a memory that is not shown. The photographer can thus capture an image of the subject via the present camera 1. The present embodiment has been described with reference to a mirrorless camera. The same effects as those provided by the camera 1 described above can be provided even in a case where the optical system ZL according to the present embodiment is incorporated in a single lens reflex camera that includes a quick-return mirror in a camera body and allows the photographer to observe a subject through a finder optical system.

In this manner, when the optical system ZL configured as described above is provided in an optical apparatus according to the present embodiment, it is possible to achieve an optical apparatus that has a small size and in which a variety of aberrations, in particular, chromatic aberration is favorably corrected.

The contents described below are employable as appropriate to the extent that the optical performance is not compromised.

In the present embodiment, the optical system ZL having a two-group configuration that roughly includes the front lens group GA and the rear lens group GB has been shown, and the configuration conditions and others described above are also applicable to a three-group configuration, a four-group configuration, a five-group configuration, a six-group configuration, a seven-group configuration, and other group configurations. Further, the optical system ZL may instead have a configuration in which a lens or a lens group closest to the object side is added or a configuration in which a lens or a lens group closest to the image side is added. The lens group represents a portion including at least one lens separated from another by an air space that changes at magnification change.

A focusing lens group may be a single lens group, a plurality of lens groups, or a partial lens group moved in the optical axis direction to perform focusing upon from an infinite distance object to a close distance object. In this case, the focusing lens group can also be used for autofocusing and is suitably driven with a motor for autofocusing (such as an ultrasonic wave motor). In particular, it is preferable that the focusing lens group is at least part (for example, a sixth lens group G6) of the rear lens group GB.

An anti-vibration lens group may be a lens group or a partial lens group so moved as to have a component in a direction perpendicular to the optical axis or rotated (swung) in an in-plane direction containing the optical axis to correct an image blur caused by a camera shake. In particular, it is preferable that the anti-vibration lens group is at least part (for example, part of a seventh lens group G7) of the rear lens group GB.

A lens surface may be so formed as to be a spherical surface, a flat surface, or an aspheric surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small. In the case where the lens surface is an aspheric surface, the aspheric surface may be any of a ground aspheric surface, a glass molded aspheric surface that is a glass surface so molded in a die as to have an aspheric shape, and a composite aspheric surface that is a glass surface on which aspherically shaped resin is formed. The lens surface may instead be a diffractive surface, or the lenses may be any of a distributed index lens (GRIN lens) or a plastic lens.

The aperture stop S is preferably disposed in the rear lens group GB (for example, on the object side of the focusing lens group Gf). Instead, no member as the aperture stop may be provided, and the frame of a lens may serve as the aperture stop.

Further, each lens surface may be provided with an antireflection film having high transmittance over a wide wavelength range to achieve good optical performance that reduces flare and ghost and achieves high contrast.

The optical system ZL of the present embodiment has a magnification ratio of 1.2 to 4.0 approximately.

The configurations and conditions described above each provide the effect described above, and all the configurations and conditions are not necessarily satisfied. An optical system that satisfies any of the configurations and conditions or a combination of any of the configurations and conditions can provide the effects described above.

A method for manufacturing the optical system ZL according to the present embodiment will be schematically described below with reference to FIG. 10. First, lenses are disposed to prepare the front lens group GA including the diffraction lens Lpf, and the rear lens group GB (step S100), and these lens groups are disposed so that the interval between the lens groups changes at magnification change (step S200). Furthermore, the front lens group GA and the rear lens group GB are disposed so that a condition expressed by above-described Conditional Expressions is satisfied (step S300).

With the above-described configurations, it is possible to provide an optical system having a small size and high optical performance, an optical apparatus including the optical system, and a method for manufacturing the optical system.

EXAMPLES

Examples of the present application will be described below with reference to the drawings. FIGS. 1, 3, 5, and 7 are cross-sectional views showing configurations of optical systems ZL (ZL1 to ZL4) according to first to fourth examples and the distribution of refractive power. In lower portions of the cross-sectional views of the optical systems ZL1 to ZL4, directions in which the lens groups G1 to G6 or G7 move along the optical axis at magnification change from a wide-angle state (W) to a telescopic state (T) are shown by arrows.

In each example, a phase shape iv of the diffraction surface D is expressed by the following Expression (a).

$$\psi(h,n) = (2\pi/(n \times \lambda 0)) \times (C2h^2 + C4h^4) \qquad (a)$$

In the expression,
h: height in a direction perpendicular to the optical axis,
n: order of diffracted light,
λ0: design wavelength, and
Ci: phase coefficient (i=2, 4)

The refractive power φD of a diffractive optical surface, which is expressed by Expression (a) with an optional wavelength λ and an optional diffraction order n, is expressed by following Expression (b) with the lowest-order phase coefficient C2.

$$\phi D(\lambda, n) = -2 \times C2 \times n \times \lambda / \lambda 0 \qquad (b)$$

In a table in each example, a diffraction surface is affixed with a mark # on the right of a surface number.

First Example

FIG. 1 shows a configuration of the optical system ZL1 according to the first example. The optical system ZL1 includes, sequentially from the object side, a first lens group G1 having positive refractive power, a front lens group GA that is a second lens group G2 having positive refractive power and includes a diffraction lens Lpf having a diffraction surface D, and a rear lens group GB. The rear lens group GB includes, sequentially from the object side, a third lens group G3 having negative refractive power, a fourth lens group G4 having positive refractive power, a fifth lens group G5 having positive refractive power, a sixth lens group G6 having negative refractive power, and a seventh lens group G7 that is a final lens group GL and has negative refractive power.

In the optical system ZL1, the first lens group G1 includes a biconvex positive lens L11. The second lens group G2 includes, sequentially from the object side, the diffraction lens Lpf having the diffraction surface D at a lens surface of a positive meniscus lens L21 on the image side, the positive meniscus lens L21 having a convex surface facing the object side, and a cemented negative lens formed by cementing a biconvex positive lens L22 and a biconcave negative lens L23 to each other. The third lens group G3 includes, sequentially from the object side, a cemented negative lens formed by cementing a negative meniscus lens L31 having a convex surface facing the object side and a positive meniscus lens L32 having a convex surface facing the object side to each other, and a cemented negative lens formed by cementing a positive meniscus lens L33 having a concave surface facing the object side and a negative meniscus lens L34 having a concave surface facing the object side to each other. The fourth lens group G4 includes a cemented positive lens formed by cementing a negative meniscus lens L41 having a convex surface facing the object side and a biconvex positive lens L42 to each other sequentially from the object side. The fifth lens group G5 includes, sequentially from the object side, a cemented positive lens formed by cementing a biconvex positive lens L51 and a negative meniscus lens L52 having a concave surface facing the object side to each other, and a positive meniscus lens L53 having a convex surface facing the object side. The sixth lens group G6 includes a biconcave negative lens L61. The seventh lens group G7 includes, sequentially from the object side, a cemented positive lens formed by cementing a positive meniscus lens L71 having a concave surface facing the object side and a biconcave negative lens L72 to each other, a biconcave negative lens L73, a cemented positive lens formed by cementing a biconvex positive lens L74 and a negative meniscus lens L75 having a concave surface facing the object side to each other, a biconvex positive lens L76, and a negative meniscus lens L77 having a concave surface facing the object side. An aperture stop S is disposed between the fifth lens group G5 and the sixth lens group G6.

In the optical system ZL1, at magnification change from the wide-angle state to the telescopic state, the first lens group G1, the third lens group G3, the fourth lens group G4, the fifth lens group G5, the aperture stop S, and the sixth lens group G6 move in the optical axis direction so that the distance between the first lens group G1 and the second lens group G2 increases, the distance between the second lens group G2 and the third lens group G3 increases, the distance between the third lens group G3 and the fourth lens group G4 decreases, the distance between the fourth lens group G4 and the fifth lens group G5 increases, the distance between the fifth lens group G5 and the aperture stop S decreases, the distance between the aperture stop S and the sixth lens group G6 decreases, and the distance between the sixth lens group G6 and the seventh lens group G7 increases. The second lens group G2 and the seventh lens group G7 are fixed with respect to the image plane at magnification change.

With the focusing lens group Gf as the sixth lens group G6, the optical system ZL1 performs focusing upon from an infinite distance object to a close distance object by moving the focusing lens group Gf to the image side.

With the anti-vibration lens group Gvr as the cemented positive lens formed by cementing the positive meniscus lens L71 and the biconcave negative lens L72 to each other and the biconcave negative lens L73 in the seventh lens group G7, the optical system ZL1 corrects image position change (image blur) due to, for example, vibration of the optical system ZL1 by moving the anti-vibration lens group Gvr with a displacement component in the direction perpendicular to the optical axis.

In the optical system ZL1, the first specific negative lens Ln1 is the negative meniscus lens L61 of the sixth lens group G6, the second specific negative lens Ln2 is the biconcave negative lens L72 of the seventh lens group G7, and the third specific negative lens Ln3 is the negative meniscus lens L75 of the seventh lens group G7.

Table 1 below shows values of specifications of the optical system ZL1. In Table 1, the following specifications shown as overall specifications are defined as follows: f represents the overall focal length; FNO represents the F number; 2ω represents the full angle of view; Ymax represents the maximum image height; TL represents the total length of the optical system; and Bf represents the back focus. A value in a wide-angle state, two values in an intermediate focal-length state, and a value in a telescopic state are shown for each specification. The total length TL of the optical system represents the distance on the optical axis from a lens surface (first surface) closest to the object side to an image plane I. The back focus Bf represents the distance on the optical axis from a lens surface (the thirty-eighth surface in FIG. 1) closest to the image side to the image plane I. In the lens data, a first field m shows the sequence of the lens surfaces (surface numbers) counted from the object side in a direction in which the rays travel. A second field r shows the radius of curvature of each lens surface. A third field d shows an distance (inter-surface distance) on the optical axis from each optical surface to the following optical surface. A fourth field nd and a fifth field vd show the refractive index and the Abbe number at the d line (λ=587.6 nm). A radius of curvature of 0.0000 represents a flat surface, and the refractive index of air, which is 1.000000, is omitted. The lens group focal length shows the first surface and the focal length of each of the first to seventh lens groups G1 to G7.

The unit of each of the focal length f, the radius of curvature r, the inter-surface distance d, and other lengths shown in all the variety of specifications below is typically "mm", but not limited to this, because an optical system provides the same optical performance even when the optical system is proportionally enlarged or reduced. Further, the description of the reference characters and the description of the specification tables hold true for those in the following examples.

TABLE 1

First example

[Overall specifications]

| | | Wide-angle state | | Intermediate focal-length state | | | | Telescopic state |
|---|---|---|---|---|---|---|---|---|
| f | = | 205.000 | to | 300.000 | to | 400.000 | to | 486.800 |
| FNO | = | 5.80 | to | 5.80 | to | 5.80 | to | 5.80 |

TABLE 1-continued

First example

[Overall specifications]

| 2ω (°) | = | 12.20 | to | 8.10 | to | 6.10 | to | 5.00 |
|---|---|---|---|---|---|---|---|---|
| Ymax | = | 21.700 | to | 21.700 | to | 21.700 | to | 21.7000 |
| TL (air equivalent length) | = | 309.985 | to | 346.860 | to | 371.010 | to | 386.088 |
| Bf (air equivalent length) | = | 46.220 | to | 46.220 | to | 46.220 | to | 46.220 |

[Lens data]

| m | r | d | nd | νd | |
|---|---|---|---|---|---|
| Object plane | ∞ | | | | |
| 1 | 254.0785 | 7.3000 | 1.487490 | 70.32 | |
| 2 | −849.8826 | d1 | | | |
| 3 | 100.1717 | 7.9000 | 1.516800 | 64.13 | |
| 4 | 1236.3929 | 0.2000 | 1.527800 | 33.36 | |
| 5# | 1236.3929 | 0.3000 | 1.557147 | 49.98 | |
| 6 | 1236.3929 | 1.5298 | | | |
| 7 | 103.1253 | 7.6000 | 1.487490 | 70.32 | |
| 8 | −543.2044 | 2.2000 | 1.834000 | 37.18 | |
| 9 | 103.4183 | d2 | | | |
| 10 | 214.9015 | 1.7000 | 1.603110 | 60.69 | |
| 11 | 42.4820 | 3.8233 | 1.755200 | 27.57 | |
| 12 | 69.2113 | 5.3961 | | | |
| 13 | −109.6455 | 3.6450 | 1.603420 | 38.03 | |
| 14 | −53.8051 | 1.6000 | 1.603110 | 60.69 | |
| 15 | −777.5523 | d3 | | | |
| 16 | 122.1606 | 1.6000 | 1.846660 | 23.80 | |
| 17 | 79.4358 | 6.5000 | 1.497820 | 82.57 | |
| 18 | −109.5364 | d4 | | | |
| 19 | 100.2140 | 5.2000 | 1.487490 | 70.32 | |
| 20 | −97.6279 | 1.3000 | 1.834810 | 42.73 | |
| 21 | −763.2390 | 0.2000 | | | |
| 22 | 78.1823 | 3.4000 | 1.497820 | 82.57 | |
| 23 | 588.3269 | d5 | | | |
| 24 | 0.0000 | d6 | | | Aperture stop S |
| 25 | −523.2367 | 1.2000 | 1.497820 | 82.57 | |
| 26 | 41.4358 | d7 | | | |
| 27 | −2692.1361 | 3.4000 | 1.717360 | 29.57 | |
| 28 | −39.0458 | 1.1000 | 1.487490 | 70.32 | |
| 29 | 149.9024 | 2.8144 | | | |
| 30 | −83.9778 | 1.1000 | 1.834810 | 42.73 | |
| 31 | 80.6792 | 2.2000 | | | |
| 32 | 70.4993 | 6.1517 | 1.517420 | 52.20 | |
| 33 | −37.9968 | 1.3000 | 1.846660 | 23.80 | |
| 34 | −49.9102 | 28.4592 | | | |
| 35 | 133.8635 | 3.9297 | 1.581440 | 40.98 | |
| 36 | −200.0000 | 12.2904 | | | |
| 37 | −72.2377 | 1.4000 | 1.834810 | 42.73 | |
| 38 | −200.0000 | 46.2202 | | | |
| Image plane | ∞ | | | | |

[Focal length of lens groups]

| Lens group | First surface | Focal length |
|---|---|---|
| First lens group | 1 | 402.114 |
| Second lens group | 3 | 672.552 |
| Third lens group | 10 | −110.137 |
| Fourth lens group | 16 | 142.197 |
| Fifth lens group | 19 | 126.943 |
| Sixth lens group | 25 | −77.072 |
| Seventh lens group | 27 | −2179.462 |

In the optical system ZL1, the fifth surface is a diffraction surface. Table 2 below shows diffraction surface data, in other words, values of the design wavelength λ0, the order n, and the phase coefficients C2 and C4.

TABLE 2

[Data on diffraction surface]

| m | λ0 | n | C2 | C4 |
|---|-----|-----|--------------|-------------|
| 5 | 587.562 | 1.0 | −3.29833E−05 | 1.41580E−09 |

In the optical system ZL1, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the aperture stop S, an on-axis air space d6 between the aperture stop S and the sixth lens group G6, and an on-axis air space d7 between the sixth lens group G6 and the seventh lens group G7 change at magnification change and focusing. Table 3 below shows the values of variable distances at focal lengths in the wide-angle state, the intermediate focal-length state, and the telescopic state at each of focusing upon an object at infinity, focusing upon an object at a close distance, and focusing upon an object at the closest distance. In Table 3, f represents the focal length, β represents the magnification, and d0 represents the distance from the first surface to an object. The description also holds true for the following examples.

TABLE 3

[Variable distance data]

| | Wide-angle state | Intermediate focal-length state | Telescopic state | |
|---|---|---|---|---|
| Focusing upon an object at infinity ||||
| f  | 205.000 | 300.000 | 400.000 | 486.800 |
| d0 | ∞ | ∞ | ∞ | ∞ |
| d1 | 15.1923 | 52.1496 | 76.2445 | 91.1517 |
| d2 | 5.2390  | 19.4434 | 33.9175 | 46.4758 |
| d3 | 71.7334 | 41.5723 | 18.0905 | 2.0000 |
| d4 | 2.0000  | 15.8305 | 28.1619 | 40.3132 |
| d5 | 22.4098 | 19.8129 | 13.4769 | 3.1339 |
| d6 | 10.6047 | 6.9254  | 4.2307  | 3.6163 |
| d7 | 9.8166  | 18.1202 | 23.9075 | 26.4376 |
| Focusing upon an object at a close distance ||||
| β  | −0.0333 | −0.0333 | −0.0333 | −0.0333 |
| d0 | 6028.2440 | 8807.2339 | 11748.6002 | 14296.9264 |
| d1 | 15.1923 | 52.1496 | 76.2445 | 91.1517 |
| d2 | 5.2390  | 19.4434 | 33.9175 | 46.4758 |
| d3 | 71.7334 | 41.5723 | 18.0905 | 2.0000 |
| d4 | 2.0000  | 15.8305 | 28.1619 | 40.3132 |
| d5 | 22.4098 | 19.8129 | 13.4769 | 3.1339 |
| d6 | 12.0254 | 8.7926  | 6.5524  | 6.3635 |
| d7 | 8.3959  | 16.2530 | 21.5858 | 23.6905 |
| Focusing upon an object at the closest distance ||||
| β  | −0.1015 | −0.1457 | −0.1901 | −0.2253 |
| d0 | 1890.0152 | 1853.1399 | 1828.9896 | 1813.9116 |
| d1 | 15.1923 | 52.1496 | 76.2445 | 91.1517 |
| d2 | 5.2390  | 19.4434 | 33.9175 | 46.4758 |
| d3 | 71.7334 | 41.5723 | 18.0905 | 2.0000 |
| d4 | 2.0000  | 15.8305 | 28.1619 | 40.3132 |
| d5 | 22.4098 | 19.8129 | 13.4769 | 3.1339 |
| d6 | 15.0280 | 15.4635 | 18.5543 | 24.5225 |
| d7 | 5.3933  | 9.5820  | 9.5840  | 5.5315 |

FIG. 2 shows a variety of aberration diagrams of the optical system ZL1 in the wide-angle state and the telescopic state. In each aberration diagram, FNO represents the F number, and Y represents the image height. The spherical aberration diagram shows the value of the F number corresponding to the maximum aperture, the astigmatism diagram and the distortion diagram each show the maximum value of the image height, and the lateral aberration diagram shows the value of each image height. Reference character d represents the d line (λ=587.6 nm), and reference character g represents the g line (λ=435.8 nm). In the astigmatism diagram, the solid line represents the sagittal image plane, and the dashed line represents the meridional image plane. Further, in the aberration diagrams in the following examples, reference characters same as those in the present example are used. The variety of aberration diagrams show that the optical system ZL1 allows favorable correction of the variety of aberrations from the wide-angle state to the telescopic state and provides excellent imaging performance.

Second Example

FIG. 3 shows a configuration of the optical system ZL2 according to the second example. The optical system ZL2 includes, sequentially from the object side, a first lens group G1 having positive refractive power, a front lens group GA that is a second lens group G2 having positive refractive power and includes a diffraction lens Lpf having a diffraction surface D, and a rear lens group GB. The rear lens group GB includes, sequentially from the object side, a third lens group G3 having negative refractive power, a fourth lens group G4 having positive refractive power, a fifth lens group G5 having positive refractive power, a sixth lens group G6 having negative refractive power, and a seventh lens group G7 that is a final lens group GL and has negative refractive power.

In the optical system ZL2, the first lens group G1 includes a biconvex positive lens L11. The second lens group G2 includes, sequentially from the object side, a cemented negative lens formed by cementing a biconvex positive lens L21 and a biconcave negative lens L22 to each other, and the diffraction lens Lpf having the diffraction surface D at a lens surface of a positive meniscus lens L23 on the image side, the positive meniscus lens L23 having a convex surface facing the object side. The third lens group G3 includes, sequentially from the object side, a cemented negative lens formed by cementing a negative meniscus lens L31 having a convex surface facing the object side and a positive meniscus lens L32 having a convex surface facing the object side to each other, and a cemented negative lens formed by cementing a positive meniscus lens L33 having a concave surface facing the object side and a negative meniscus lens L34 having a concave surface facing the object side to each other. The fourth lens group G4 includes a cemented positive lens formed by cementing a negative meniscus lens L41 having a convex surface facing the object side and a biconvex positive lens L42 to each other sequentially from the object side. The fifth lens group G5 includes, sequentially from the object side, a cemented positive lens formed by cementing a biconvex positive lens L51 and a negative meniscus lens L52 having a concave surface facing the object side to each other, and a positive meniscus lens L53 having a convex surface facing the object side. The sixth lens group G6 includes a negative meniscus lens L61 having a concave surface facing the object side. The seventh lens group G7 includes, sequentially from the object side, a cemented positive lens formed by cementing a biconvex positive lens L71 and a biconcave negative lens L72 to each other, a biconcave negative lens L73, a cemented positive lens formed by cementing a biconvex positive lens L74 and a negative meniscus lens L75 having a concave surface facing the object side to each other, a positive meniscus lens L76 having a concave surface facing the object side, and a negative meniscus lens L77 having a concave surface facing the object side. An aperture stop S is disposed between the fifth lens group G5 and the sixth lens group G6.

In the optical system ZL2, at magnification change from the wide-angle state to the telescopic state, the first lens group G1, the second lens group G2, the third lens group G3, the fourth lens group G4, the fifth lens group G5, the aperture stop S, and the sixth lens group G6 move in the optical axis direction so that the distance between the first lens group G1 and the second lens group G2 increases, the distance between the second lens group G2 and the third lens group G3 increases, the distance between the third lens group G3 and the fourth lens group G4 decreases, the distance between the fourth lens group G4 and the fifth lens group G5 increases, the distance between the fifth lens group G5 and the aperture stop S decreases, the distance between the aperture stop S and the sixth lens group G6 decreases, and the distance between the sixth lens group G6 and the seventh lens group G7 increases. The seventh lens group G7 is fixed with respect to the image plane at magnification change.

With the focusing lens group Gf as the sixth lens group G6, the optical system ZL2 performs focusing upon from an infinite distance object to a close distance object by moving the focusing lens group Gf to the image side.

With the anti-vibration lens group Gvr as the cemented positive lens formed by cementing the biconvex positive lens L71 and the biconcave negative lens L72 to each other and the biconcave negative lens L73 in the seventh lens group G7, the optical system ZL2 corrects image position change (image blur) due to, for example, vibration of the optical system ZL2 by moving the anti-vibration lens group Gvr with a displacement component in the direction perpendicular to the optical axis.

In the optical system ZL2, the first specific negative lens Ln1 is the negative meniscus lens L61 of the sixth lens group G6, the second specific negative lens Ln2 is the biconcave negative lens L72 of the seventh lens group G7, and the third specific negative lens Ln3 is the negative meniscus lens L75 of the seventh lens group G7.

Table 4 below shows values of specifications of the optical system ZL2. In Table 4, the lens group focal length shows the first surface and the focal length of each of the first to seventh lens groups G1 to G7.

TABLE 4

| Second example | | | | | | | |
|---|---|---|---|---|---|---|---|
| [Overall specifications] | | | | | | | |
| | | Wide-angle state | | Intermediate focal-length state | | | Telescopic state |
| f | = | 205.000 | to | 300.000 | to | 400.000 | to | 486.800 |
| FNO | = | 5.80 | to | 5.80 | to | 5.80 | to | 5.80 |
| 2ω (°) | = | 12.20 | to | 8.10 | to | 6.10 | to | 5.00 |
| Ymax | = | 21.700 | to | 21.700 | to | 21.700 | to | 21.7000 |
| TL (air equivalent length) | = | 309.991 | to | 348.121 | to | 376.459 | to | 395.024 |
| Bf (air equivalent length) | = | 53.580 | to | 53.580 | to | 53.580 | to | 53.580 |

| [Lens data] | | | | |
|---|---|---|---|---|
| m | r | d | nd | vd |
| Object plane | ∞ | | | |
| 1 | 282.6354 | 7.7000 | 1.487490 | 70.32 |
| 2 | −642.2659 | d1 | | |
| 3 | 128.8725 | 8.5000 | 1.487490 | 70.32 |
| 4 | −246.4894 | 2.9000 | 1.834000 | 37.18 |
| 5 | 218.4075 | 12.4524 | | |
| 6 | 128.3795 | 6.6000 | 1.516800 | 64.13 |
| 7 | 664.6127 | 0.2000 | 1.527800 | 33.36 |
| 8# | 664.6127 | 0.3000 | 1.557147 | 49.98 |
| 9 | 664.6127 | d2 | | |
| 10 | 221.3422 | 1.7000 | 1.593490 | 67.00 |
| 11 | 41.8416 | 3.6079 | 1.737999 | 32.33 |
| 12 | 69.1709 | 5.1938 | | |
| 13 | −88.1369 | 3.5380 | 1.620040 | 36.40 |
| 14 | −46.7983 | 1.6000 | 1.593490 | 67.00 |
| 15 | −345.4650 | d3 | | |
| 16 | 116.6629 | 1.6000 | 1.854779 | 24.80 |
| 17 | 70.1121 | 7.000 | 1.497820 | 82.57 |
| 18 | −94.8648 | d4 | | |
| 19 | 109.7141 | 5.6000 | 1.487490 | 70.32 |
| 20 | −89.4788 | 1.3000 | 1.834810 | 42.73 |
| 21 | −759.2096 | 0.2000 | | |
| 22 | 66.2440 | 3.8000 | 1.497820 | 82.57 |
| 23 | 533.5964 | d5 | | |
| 24 | 0.0000 | d6 | | Aperture |

TABLE 4-continued

Second example

[Overall specifications]

stop S

| | | | | |
|---|---|---|---|---|
| 25 | 458.6915 | 1.2000 | 1.497820 | 82.57 |
| 26 | 37.7676 | d7 | | |
| 27 | 410.7201 | 3.8000 | 1.698950 | 30.13 |
| 28 | −41.4786 | 1.1000 | 1.497820 | 82.57 |
| 29 | 77.0949 | 2.0909 | | |
| 30 | −104.9331 | 1.1000 | 1.763850 | 48.49 |
| 31 | 57.8594 | 2.2000 | | |
| 32 | 60.7986 | 6.4494 | 1.647690 | 33.72 |
| 33 | −39.3235 | 1.3000 | 1.945944 | 17.98 |
| 34 | −59.9206 | 147446 | | |
| 35 | −519.7257 | 4.0124 | 1.548140 | 45.51 |
| 36 | −52.6602 | 1.8102 | | |
| 37 | −49.5416 | 1.700 | 1.953750 | 32.33 |
| 38 | −150.7732 | 53.8499 | | |
| Image plane | ∞ | | | |

[Focal length of lens groups]

| Lens group | First surface | Focal length |
|---|---|---|
| First lens group | 1 | 497.543 |
| Second lens group | 3 | −110.064 |
| Third lens group | 10 | 134.649 |
| Fourth lens group | 16 | 122.017 |
| Fifth lens group | 19 | −82.752 |
| Sixth lens group | 25 | −266.950 |
| Seventh lens group | 27 | 497.543 |

In the optical system ZL2, the eighth surface is a diffraction surface. Table 5 below shows diffraction surface data, in other words, values of the design wavelength λ0, the order n, and the phase coefficients C2 and C4.

TABLE 5

[Data on diffraction surface]

| m | λ0 | n | C2 | C4 |
|---|---|---|---|---|
| 8 | 587.562 | 1.0 | −4.88662E−05 | 8.54150E−10 |

In the optical system ZL2, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the fifth lens group G5, an on-axis air space d5 between the fifth lens group G5 and the aperture stop S, an on-axis air space d6 between the aperture stop S and the sixth lens group G6, and an on-axis air space d7 between the sixth lens group G6 and the seventh lens group G7 change at magnification change and focusing. Table 6 below shows the values of variable distances at focal lengths in the wide-angle state, the intermediate focal-length state, and the telescopic state at each of focusing upon an object at infinity, focusing upon an object at a close distance, and focusing upon an object at the closest distance.

TABLE 6

[Variable distance data]

| | Wide-angle state | Intermediate focal-length state | | Telescopic state |
|---|---|---|---|---|
| | Focusing upon an object at infinity | | | |
| f | 205.000 | 300.000 | 400.000 | 486.800 |
| d0 | ∞ | ∞ | ∞ | ∞ |
| d1 | 35.0863 | 72.7170 | 96.8729 | 111.7476 |
| d2 | 4.0000 | 18.4016 | 34.3631 | 49.6023 |
| d3 | 58.6232 | 31.9700 | 13.8407 | 2.0000 |
| d4 | 2.0000 | 12.1985 | 19.3551 | 24.8875 |
| d5 | 22.9315 | 19.0854 | 12.3877 | 2.1508 |
| d6 | 9.6174 | 6.1513 | 3.2290 | 3.0000 |
| d7 | 8.5852 | 18.4505 | 27.2617 | 32.4878 |
| | Focusing upon an object at a close distance | | | |
| β | −0.0333 | −0.0333 | −0.0333 | −0.0333 |
| d0 | 5993.6460 | 8763.3788 | 11693.9147 | 14236.8500 |
| d1 | 35.0863 | 72.7170 | 96.8729 | 111.7476 |
| d2 | 4.0000 | 18.4016 | 34.3631 | 49.6023 |
| d3 | 58.6232 | 31.9700 | 13.8407 | 2.0000 |
| d4 | 2.0000 | 12.1985 | 19.3551 | 24.8875 |
| d5 | 22.9315 | 19.0854 | 12.3877 | 2.1508 |
| d6 | 11.1793 | 8.0983 | 5.5065 | 5.5787 |
| d7 | 7.0233 | 16.5035 | 24.9842 | 29.9092 |
| | Focusing upon an object at the closest distance | | | |
| β | −0.0871 | −0.1249 | −0.1630 | −0.1940 |
| d0 | 2190.0093 | 2151.8789 | 2123.5408 | 2104.9764 |
| d1 | 35.0863 | 72.7170 | 96.8729 | 111.7476 |
| d2 | 4.0000 | 18.4016 | 34.3631 | 49.6023 |
| d3 | 58.6232 | 31.9700 | 13.8407 | 2.0000 |
| d4 | 2.0000 | 12.1985 | 19.3551 | 24.8875 |
| d5 | 22.9315 | 19.0854 | 12.3877 | 2.1508 |
| d6 | 13.7981 | 13.7984 | 15.2346 | 19.6692 |
| d7 | 4.4045 | 10.8034 | 15.2561 | 15.8186 |

FIG. 4 shows a variety of aberration diagrams of the optical system ZL2 in the wide-angle state and the telescopic state. The variety of aberration diagrams shows that the optical system ZL2 allows favorable correction of the variety of aberrations from the wide-angle state to the telescopic state and provides excellent imaging performance.

Third Example

FIG. 5 shows a configuration of the optical system ZL3 according to the third example. The optical system ZL3 includes, sequentially from the object side, a front lens group GA that is a first lens group G1 having positive refractive power and includes a diffraction lens Lpf having a diffraction surface D, and a rear lens group GB. The rear lens group GB includes, sequentially from the object side, a second lens group G2 having negative refractive power, a third lens group G3 having positive refractive power, a fourth lens group G4 having positive refractive power, a fifth lens group G5 having negative refractive power, and a sixth lens group G6 that is a final lens group GL and has negative refractive power.

In the optical system ZL3, the first lens group G1 includes, sequentially from the object side, a biconvex positive lens L11, a positive meniscus lens L12 having a convex surface facing the object side, a diffraction lens Lpf having the diffraction surface D at a lens surface of a positive meniscus lens L13 on the image side, the positive meniscus lens L13 having a convex surface facing the object side, and a cemented negative lens formed by cementing a positive meniscus lens L14 having a convex surface facing the object side and a negative meniscus lens L15 having a convex surface facing the object side to each other. The second lens group G2 includes, sequentially from the object side, a cemented negative lens formed by cementing a negative meniscus lens L21 having a convex surface facing the object side and a positive meniscus lens L22 having a convex surface facing the object side to each other, and a biconcave negative lens L23. The third lens group G3 includes, sequentially from the object side, a biconvex positive lens L31, and a cemented positive lens formed by cementing a biconvex positive lens L32 and a negative meniscus lens L33 having a concave surface facing the object side to each other. The fourth lens group G4 includes a cemented positive lens formed by cementing a negative meniscus lens L41 having a convex surface facing the object side and a positive meniscus lens L42 having a convex surface facing the object side to each other sequentially from the object side. The fifth lens group G5 includes a negative meniscus lens L51 having a convex surface facing the object side. The sixth lens group G6 includes, sequentially from the object side, a cemented negative lens formed by cementing a biconvex positive lens L61 and a biconcave negative lens L62 to each other, a biconcave negative lens L63, a cemented positive lens formed by cementing a biconvex positive lens L64 and a negative meniscus lens L65 having a concave surface facing the object side to each other, a cemented positive lens formed by cementing a biconcave negative lens L66 and a biconvex positive lens L67 to each other, and a cemented negative lens formed by cementing a biconvex positive lens L68 and a biconcave negative lens L69 to each other. An aperture stop S is disposed between the fourth lens group G4 and the fifth lens group G5.

In the optical system ZL3, at magnification change from the wide-angle state to the telescopic state, the second lens group G2, the third lens group G3, and the fourth lens group G4 move in the optical axis direction so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. The first lens group G1, the fifth lens group G5, the sixth lens group G6, and the aperture stop S are fixed with respect to the image plane at magnification change.

With the focusing lens group Gf as the fifth lens group G5, the optical system ZL3 performs focusing upon from an infinite distance object to a close distance object by moving the focusing lens group Gf to the image side.

With the anti-vibration lens group Gvr as the cemented negative lens formed by cementing the biconvex positive lens L61 and the biconcave negative lens L62 to each other and the biconcave negative lens L63 in the sixth lens group G6, the optical system ZL3 corrects image position change (image blur) due to, for example, vibration of the optical system ZL3 by moving the anti-vibration lens group Gvr with a displacement component in the direction perpendicular to the optical axis.

In the optical system ZL3, the first specific negative lens Ln1 is the negative meniscus lens L51 of the fifth lens group G5, the second specific negative lens Ln2 is the biconcave negative lens L62 of the sixth lens group G6, and the third specific negative lens Ln3 is the negative meniscus lens L65 of the sixth lens group G6.

Table 7 below shows values of specifications of the optical system ZL3. In Table 7, the lens group focal length shows the first surface and the focal length of each of the first to sixth lens groups G1 to G6.

TABLE 7

| Third example |
|---|

| [Overall specifications] |
|---|

| | | Wide-angle state | | Intermediate focal-length state | | | | Telescopic state |
|---|---|---|---|---|---|---|---|---|
| f | = | 306.000 | to | 375.000 | to | 450.000 | to | 588.000 |
| FNO | = | 6.40 | to | 6.40 | to | 6.40 | to | 6.40 |
| 2ω (°) | = | 8.10 | to | 6.40 | to | 5.30 | to | 4.10 |
| Ymax | = | 21.700 | to | 21.700 | to | 21.700 | to | 21.7000 |
| TL (air equivalent length) | = | 329.948 | to | 329.948 | to | 329.948 | to | 329.948 |
| Bf (air equivalent length) | = | 52.139 | to | 52.139 | to | 52.139 | to | 52.139 |

TABLE 7-continued

Third example

[Overall specifications]

[Lens data]

| m | r | d | nd | vd |
|---|---|---|---|---|
| Object plane | ∞ | | | |
| 1 | 223.0897 | 9.0000 | 1.487490 | 70.32 |
| 2 | −2499.7170 | 0.2000 | | |
| 3 | 259.0655 | 6.0000 | 1.487490 | 70.32 |
| 4 | 809.7669 | 29.8001 | | |
| 5 | 72.6287 | 10.5000 | 1.516800 | 64.13 |
| 6 | 187.6069 | 0.2000 | 1.527800 | 33.36 |
| 7# | 187.6069 | 0.3000 | 1.557147 | 49.98 |
| 8 | 187.6069 | 0.2000 | | |
| 9 | 73.2943 | 8.6000 | 1.487490 | 70.32 |
| 10 | 155.3551 | 3.3000 | 1.902650 | 35.72 |
| 11 | 58.1940 | d1 | | |
| 12 | 2518.2275 | 2.3000 | 1.593190 | 67.90 |
| 13 | 38.8981 | 8.8000 | 1.620040 | 36.40 |
| 14 | 169.4898 | 4.1741 | | |
| 15 | −128.2896 | 2.3000 | 1.593190 | 67.90 |
| 16 | 160.6010 | d2 | | |
| 17 | 111.3992 | 6.8000 | 1.497820 | 82.57 |
| 18 | −115.5330 | 0.2000 | | |
| 19 | 117.3443 | 6.6000 | 1.497820 | 82.57 |
| 20 | −99.9337 | 2.2000 | 1.834810 | 42.73 |
| 21 | −1722.6637 | d3 | | |
| 22 | 46.2607 | 1.8000 | 1.834810 | 42.73 |
| 23 | 33.4269 | 7.3000 | 1.437001 | 95.10 |
| 24 | 921.5481 | d4 | | Aperture stop S |
| 25 | 0.0000 | d5 | | |
| 26 | 245.9026 | 1.2000 | 1.497820 | 82.57 |
| 27 | 34.7408 | d6 | | |
| 28 | 128.5153 | 4.8000 | 1.647690 | 33.72 |
| 29 | −26.3998 | 1.2000 | 1.593190 | 67.90 |
| 30 | 56.4530 | 2.2648 | | |
| 31 | −99.9188 | 1.2000 | 1.834810 | 42.73 |
| 32 | 53.5072 | 2.1608 | | |
| 33 | 41.0489 | 6.2000 | 1.755200 | 27.57 |
| 34 | −33.6117 | 1.2000 | 1.945944 | 17.98 |
| 35 | −314.2067 | 1.0000 | | |
| 36 | −397.2352 | 1.3000 | 1.834810 | 42.73 |
| 37 | 34.1457 | 7.2000 | 16.03240 | 38.03 |
| 38 | −39.2481 | 0.2000 | | |
| 39 | 56.9659 | 7.0000 | 1.603420 | 38.03 |
| 40 | −35.0081 | 1.3000 | 1.834810 | 42.73 |
| 41 | 94.5542 | 52.1387 | | |
| Image plane | ∞ | | | |

[Focal length of lens groups]

| Lens group | First surface | Focal length |
|---|---|---|
| First lens group | 1 | 241.670 |
| Second lens group | 12 | −83.460 |
| Third lens group | 17 | 98.299 |
| Fourth lens group | 22 | 169.346 |
| Fifth lens group | 26 | −81.421 |
| Sixth lens group | 28 | −144.655 |

In the optical system ZL3, the seventh surface is a diffraction surface. Table 8 below shows diffraction surface data, in other words, values of the design wavelength λ0, the order n, and the phase coefficients C2 and C4.

TABLE 8

[Data on diffraction surface]

| m | λ0 | n | C2 | C4 |
|---|---|---|---|---|
| 8 | 587.562 | 1.0 | −3.79176E−05 | −5.49873E−10 |

In the optical system ZL3, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the aperture stop S, an on-axis air space d5 between the aperture stop S and the fifth lens group G5, and an on-axis air space d6 between the fifth lens group G5 and the sixth lens group G6 change at magnification change or focusing. Table 9 below shows the values of variable distances at focal lengths in the wide-angle state, the intermediate focal-length state, and the telescopic state at each of focusing upon an object at infinity, focusing upon an object at a close distance, and focusing upon an object at the closest distance.

TABLE 9

[Variable distance data]

| | Wide-angle state | Intermediate focal-length state | Telescopic state | |
|---|---|---|---|---|
| Focusing upon an object at infinity | | | | |
| f | 306.000 | 375.000 | 450.000 | 588.000 |
| d0 | ∞ | ∞ | ∞ | ∞ |
| d1 | 8.2880 | 20.4670 | 29.9682 | 41.7344 |
| d2 | 61.6784 | 43.6483 | 26.8374 | 2.0000 |
| d3 | 2.0000 | 11.4752 | 24.3876 | 52.1668 |
| d4 | 27.0009 | 23.3786 | 17.7734 | 3.0657 |
| d5 | 3.5804 | 3.5804 | 3.5804 | 3.5804 |
| d6 | 26.4619 | 26.4619 | 26.4619 | 26.4619 |
| Focusing upon an object at a close distance | | | | |
| β | −0.0333 | −0.0333 | −0.0333 | −0.0333 |
| d0 | 8969.0498 | 11012.1338 | 13228.4896 | 17325.9277 |
| d1 | 8.2880 | 20.4670 | 29.9682 | 41.7344 |
| d2 | 61.6784 | 43.6483 | 26.8374 | 2.0000 |
| d3 | 2.0000 | 11.4752 | 24.3876 | 52.1668 |
| d4 | 27.0009 | 23.3786 | 17.7734 | 3.0657 |
| d5 | 5.1948 | 5.5652 | 5.9727 | 6.7242 |
| d6 | 24.8475 | 24.4771 | 24.0696 | 23.3181 |
| Focusing upon an object at the closest distance | | | | |
| β | −0.1058 | −0.1281 | −0.1520 | −0.1916 |
| d0 | 2670.0520 | 2670.0508 | 2670.0515 | 2670.0516 |
| d1 | 8.2880 | 20.4670 | 29.9682 | 41.7344 |
| d2 | 61.6784 | 43.6483 | 26.8374 | 2.0000 |
| d3 | 2.0000 | 11.4752 | 24.3876 | 52.1668 |
| d4 | 27.0009 | 23.3786 | 17.7734 | 3.0657 |
| d5 | 8.8767 | 11.6424 | 15.4728 | 25.1573 |
| d6 | 21.1656 | 18.3999 | 14.5695 | 4.8850 |

FIG. 6 shows a variety of aberration diagrams of the optical system ZL3 in the wide-angle state and the telescopic state. The variety of aberration diagrams shows that the optical system ZL3 allows favorable correction of the variety of aberrations from the wide-angle state to the telescopic state and provides excellent imaging performance.

Fourth Example

FIG. 7 shows a configuration of an optical system ZL4 according to the fourth example. The optical system ZL4 includes, sequentially from the object side, a front lens group GA that is a first lens group G1 having positive refractive power and includes a diffraction lens Lpf having a diffraction surface D, and a rear lens group GB. The rear lens group GB includes, sequentially from the object side, a second lens group G2 having negative refractive power, a third lens group G3 having positive refractive power, a fourth lens group G4 having positive refractive power, a fifth lens group G5 having negative refractive power, and a sixth lens group G6 that is a final lens group GL and has negative refractive power.

In the optical system ZL4, the first lens group G1 includes, sequentially from the object side, a biconvex positive lens L11, the diffraction lens Lpf having the diffraction surface D at a lens surface of a positive meniscus lens L12 on the image side, the positive meniscus lens L12 having a convex surface facing the object side, and a cemented negative lens formed by cementing a positive meniscus lens L13 having a convex surface facing the object side and a negative meniscus lens L14 having a convex surface facing the object side to each other. The second lens group G2 includes, sequentially from the object side, a cemented negative lens formed by cementing a negative meniscus lens L21 having a convex surface facing the object side and a positive meniscus lens L22 having a convex surface facing the object side to each other, and a biconcave negative lens L23. The third lens group G3 includes, sequentially from the object side, a biconvex positive lens L31, and a cemented positive lens formed by cementing a biconvex positive lens L32 and a biconcave negative lens L33 to each other. The fourth lens group G4 includes a cemented positive lens formed by cementing a negative meniscus lens L41 having a convex surface facing the object side and a positive meniscus lens L42 having a convex surface facing the object side to each other sequentially from the object side. The fifth lens group G5 includes a negative meniscus lens L51 having a convex surface facing the object side. The sixth lens group G6 includes, sequentially from the object side, a cemented negative lens formed by cementing a biconvex positive lens L61 and a biconcave negative lens L62 to each other, a biconcave negative lens L63, a cemented positive lens formed by cementing a biconvex positive lens L64 and a negative meniscus lens L65 having a concave surface facing the object side to each other, a cemented positive lens formed by cementing a biconcave negative lens L66 and a biconvex positive lens L67 to each other, and a cemented negative lens formed by cementing a biconvex positive lens L68 and a biconcave negative lens L69 to each other. An aperture stop S is disposed between the fourth lens group G4 and the fifth lens group G5.

In the optical system ZL4, at magnification change from the wide-angle state to the telescopic state, the second lens group G2, the third lens group G3, and the fourth lens group G4 move in the optical axis direction so that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. The first lens group G1, the fifth lens group G5, the sixth lens group G6, and the aperture stop S are fixed with respect to the image plane at magnification change.

With the focusing lens group Gf as the fifth lens group G5, the optical system ZL4 performs focusing upon from an infinite distance object to a close distance object by moving the focusing lens group Gf to the image side.

With the anti-vibration lens group Gvr as the cemented negative lens formed by cementing the biconvex positive lens L61 and the biconcave negative lens L62 to each other and the biconcave negative lens L63 in the sixth lens group G6, the optical system ZL4 corrects image position change (image blur) due to, for example, vibration of the optical system ZL4 by moving the anti-vibration lens group Gvr with a displacement component in the direction perpendicular to the optical axis.

In the optical system ZL4, the first specific negative lens Ln1 is the negative meniscus lens L51 of the fifth lens group G5, the second specific negative lens Ln2 is the biconcave negative lens L62 of the sixth lens group G6, and the third specific negative lens Ln3 is the negative meniscus lens L65 of the sixth lens group G6.

Table 10 below shows values of specifications of the optical system ZL4. In Table 10, the lens group focal length shows the first surface and the focal length of each of the first to sixth lens groups G1 to G6.

TABLE 10

Fourth example

[Overall specifications]

| | | Wide-angle state | | Intermediate focal-length state | | | | Telescopic state |
|---|---|---|---|---|---|---|---|---|
| f | = | 407.999 | to | 499.999 | to | 599.999 | to | 783.998 |
| FNO | = | 8.10 | to | 8.10 | to | 8.10 | to | 8.10 |
| 2ω (°) | = | 6.10 | to | 5.00 | to | 4.10 | to | 3.10 |
| Ymax | = | 21.700 | to | 21.700 | to | 21.700 | to | 21.7000 |
| TL (air equivalent length) | = | 435.067 | to | 435.067 | to | 435.067 | to | 435.067 |
| Bf (air equivalent length) | = | 73.106 | to | 73.106 | to | 73.106 | to | 73.106 |

[Lens data]

| m | r | d | nd | vd |
|---|---|---|---|---|
| Object plane | ∞ | | | |
| 1 | 258.4345 | 10.0000 | 1.487490 | 70.32 |
| 2 | −1168.9851 | 63.4972 | | |
| 3 | 115.6841 | 9.5000 | 1.516800 | 64.13 |
| 4 | 368.7797 | 0.2000 | 1.527800 | 33.36 |
| 5# | 368.7797 | 0.3000 | 1.557147 | 49.98 |
| 6 | 368.7797 | 3.8039 | | |
| 7 | 1050900 | 8.0000 | 1.487490 | 70.32 |
| 8 | 285.7295 | 3.4000 | 1.910822 | 35.25 |
| 9 | 100.3173 | 54.9337 | | |
| 10 | 4.75.0065 | 2.4000 | 1.593190 | 67.90 |
| 11 | 50.4771 | 8.5000 | 1.654115 | 39.68 |
| 12 | 303.4262 | 3.9981 | | |
| 13 | −191.8285 | 2.4000 | 1.593190 | 67.90 |
| 14 | 136.2524 | 234762 | | |
| 15 | 173.4580 | 6.8000 | 1.497820 | 82.57 |
| 16 | −149.4370 | 0.2000 | | |
| 17 | 127.8783 | 6.9000 | 1.497820 | 82.57 |
| 18 | −169.1970 | 2.4000 | 1.834810 | 42.73 |
| 19 | 934.1996 | 77.4827 | | |
| 20 | 63.0908 | 2.0000 | 1.84810 | 42.73 |
| 21 | 46.9742 | 7.0000 | 1.437001 | 95.10 |
| 22 | 1607.1068 | 3.0448 | | |
| 23 | 0.0000 | 3.5002 | | Aperture stop S |
| 24 | 242.6088 | 1.5000 | 1497820 | 82.57 |
| 25 | 50.7283 | 34.1399 | | |
| 26 | 100.2153 | 5.000 | 1.497820 | 82.57 |
| 27 | −35.1813 | 1.2000 | 1.593190 | 67.90 |
| 28 | 49.8987 | 4.2135 | | |
| 29 | −111.1526 | 1.2000 | 1.763850 | 48.49 |
| 30 | 72.5691 | 2.8158 | | |
| 31 | 51.6193 | 7.0000 | 1.740770 | 27.74 |
| 32 | −39.2912 | 1.4000 | 1.945944 | 17.98 |
| 33 | −178.7273 | 1.8453 | | |
| 34 | −276.0919 | 1.8000 | 1.834810 | 42.73 |
| 35 | 4.3741 | 8.3000 | 1.603420 | 38.03 |
| 36 | −53.4830 | 02097 | | |
| 37 | 108.8915 | 6.8000 | 1.603420 | 38.03 |
| 38 | −43.1723 | 1.8000 | 1.834810 | 42.73 |
| 39 | 166.6667 | 73.1064 | | |

TABLE 10-continued

Fourth example

[Overall specifications]

| | |
|---|---|
| Image plane | ∞ |

[Focal length of lens groups]

| Lens group | First surface | Focal length |
|---|---|---|
| First lens group | 1 | 314.735 |
| Second lens group | 10 | −121.354 |
| Third lens group | 15 | 137.109 |
| Fourth lens group | 20 | 25.121 |
| Fifth lens group | 24 | −129.177 |
| Sixth lens group | 26 | −119.894 |

In the optical system ZL4, the fifth surface is a diffraction surface. Table 11 below shows diffraction surface data, in other words, values of the design wavelength λ0, the order n, and the phase coefficients C2 and C4.

TABLE 11

[Data on diffraction surface]

| m | λ0 | n | C2 | C4 |
|---|---|---|---|---|
| 5 | 587.562 | 1.0 | −3.12473E−05 | −4.11319E−10 |

In the optical system ZL4, an on-axis air space d1 between the first lens group G1 and the second lens group G2, an on-axis air space d2 between the second lens group G2 and the third lens group G3, an on-axis air space d3 between the third lens group G3 and the fourth lens group G4, an on-axis air space d4 between the fourth lens group G4 and the aperture stop S, an on-axis air space d5 between the aperture stop S and the fifth lens group G5, and an on-axis air space d6 between the fifth lens group G5 and the sixth lens group G6 change at magnification change or focusing. Table 12 below shows the values of variable distances at focal lengths in the wide-angle state, the intermediate focal-length state, and the telescopic state at each of focusing upon an object at infinity, focusing upon an object at a close distance, and focusing upon an object at the closest distance.

TABLE 12

[Variable distance data]

| | Wide-angle state | Intermediate focal-length state | Telescopic state |
|---|---|---|---|
| | | | |

Focusing upon an object at infinity

| f | 407.999 | 499.999 | 599.999 | 783.998 |
|---|---|---|---|---|
| d0 | ∞ | ∞ | ∞ | ∞ |
| d1 | 8.3177 | 25.1499 | 38.4172 | 54.9337 |
| d2 | 88.0005 | 61.7682 | 37.4810 | 2.4762 |
| d3 | 2.0000 | 17.2082 | 36.8435 | 77.4827 |
| d4 | 39.6193 | 33.8128 | 25.1954 | 3.0448 |
| d5 | 3.5002 | 3.5002 | 3.5002 | 3.5002 |
| d6 | 34.1399 | 34.1399 | 34.1399 | 34.1399 |

Focusing upon an object at a close distance

| β | −0.0333 | −0.0333 | −0.0333 | −0.0333 |
|---|---|---|---|---|
| d0 | 11966.7412 | 14693.1155 | 17646.8261 | 23098.6946 |
| d1 | 8.3177 | 25.1499 | 38.4172 | 54.9337 |
| d2 | 88.0005 | 61.7682 | 37.4810 | 2.4762 |
| d3 | 2.0000 | 17.2082 | 36.8435 | 77.4827 |

TABLE 12-continued

[Variable distance data]

| | Wide-angle state | Intermediate focal-length state | Telescopic state |
|---|---|---|---|
| d4 | 39.6193 | 33.8128 | 25.1954 | 3.0448 |
| d5 | 5.6545 | 6.1493 | 6.6940 | 7.6989 |
| d6 | 31.9856 | 31.4908 | 30.9461 | 29.9412 |

Focusing upon an object at the closest distance

| β | −0.1059 | −0.1283 | −0.1521 | −0.1911 |
|---|---|---|---|---|
| d0 | 3564.9328 | 3564.9313 | 3564.9330 | 3564.9327 |
| d1 | 8.3177 | 25.1499 | 38.4172 | 54.9337 |
| d2 | 88.0005 | 61.7682 | 37.4810 | 2.4762 |
| d3 | 2.0000 | 17.2082 | 36.8435 | 77.4827 |
| d4 | 39.6193 | 33.8128 | 25.1954 | 3.0448 |
| d5 | 10.5885 | 14.3154 | 19.4917 | 32.6725 |
| d6 | 27.0516 | 23.3247 | 18.1484 | 4.9676 |

FIG. 8 shows a variety of aberration diagrams of the optical system ZL4 in the wide-angle state and the telescopic state. The variety of aberration diagrams shows that the optical system ZL4 allows favorable correction of the variety of aberrations from the wide-angle state to the telescopic state and provides excellent imaging performance.

[Values Compliant to Conditional Expressions]

The values of Conditional Expressions (1) to (15) in the first to fourth examples are listed below.

(1) TLpf/TLt
(2) Bfw/fw
(3) f1/fw
(4) f1/ft
(5) f1/fL1
(6) TLt/ft
(7) (−fImt)/fObt
(8) vdF
(9) fLPF/ft
(10) fLPF/fA
(11) φD
(12) vdVR
(13) θgFr+0.00168×vdr
(14) 2ωw [°]
(15) 2ωt [°]

| | First example | Second example | Third example | Fourth example |
|---|---|---|---|---|
| TLpf | 106.552 | 150.100 | 55.800 | 85.012 |
| TLt | 386.088 | 395.024 | 329.948 | 435.067 |

-continued

|  | First example | Second example | Third example | Fourth example |
|---|---|---|---|---|
| fL1 | 402.114 | 403.708 | 420.590 | 443.933 |
| fObt | 182.902 | 171.829 | 200.278 | 253.280 |
| flmt | −73.630 | −56.594 | −46.257 | −53.589 |
| fLPF | 207.586 | 297.738 | 218.553 | 315.650 |
| fA | 672.552 | 497.543 | 241.670 | 314.735 |
| (1) | 0.276 | 0.380 | 0.169 | 0.195 |
| (2) | 0.226 | 0.263 | 0.170 | 0.179 |
| (3) | 1.962 | 1.969 | 0.790 | 0.771 |
| (4) | 0.826 | 0.829 | 0.411 | 0.401 |
| (5) | 1.000 | 1.000 | 0.575 | 0.709 |
| (6) | 0.793 | 0.811 | 0.561 | 0.555 |
| (7) | 0.403 | 0.329 | 0.231 | 0.212 |
| (8) | 82.57 | 82.57 | 82.57 | 82.57 |
| (9) | 0.426 | 0.612 | 0.372 | 0.403 |
| (10) | 0.309 | 0.598 | 0.904 | 1.003 |
| (11) | 6.60E−05 | 9.77E−05 | 7.58E−05 | 6.25E−05 |
| (12) | 70.32 | 82.57 | 67.90 | 67.90 |
| (13) | 0.661 | 0.685 | 0.685 | 0.685 |
| (14) | 12.200 | 12.200 | 8.100 | 6.100 |
| (15) | 5.000 | 5.000 | 4.100 | 3.100 |

REFERENCE SIGNS LIST

1 Camera (optical apparatus)
ZL (ZL1 to ZL4) Optical system
Lpf Diffraction lens
D Diffraction surface
GA Front lens group
GB Rear lens group
G1 Lens group (first lens group) disposed closest to object side
GL Final lens group
Gf Focusing lens group
Gvr Anti-vibration lens group
S Aperture stop
L11 Lens (first lens) disposed closest to object side

The invention claimed is:

1. An optical system comprising:
a front lens group including a diffraction lens having a diffraction surface; and
a rear lens group disposed on an image side of the front lens group, the rear lens group including five lens groups, wherein
a distance between the front and rear lens groups changes at magnification change,
a final lens group that is closest to the image side has negative refractive power and is fixed with respect to an image plane at magnification change,
the diffraction surface is in contact with air, and
the optical system satisfies the following conditional expressions:

$$0.130 < TLpf/TLt < 0.500 \text{ and}$$

$$Bfw/fw < 0.90$$

where
TLt: total length of the optical system in a telescopic state,
TLpf: distance on an optical axis from a lens surface closest to an object side in the optical system to the diffraction surface in the telescopic state,
fw: overall focal length of the optical system in a wide-angle state, and
Bfw: back focus of the optical system in the wide-angle state.

2. The optical system according to claim 1, wherein the optical system satisfies the following conditional expression:

$$0.50 < f1/fw < 5.00$$

where
f1: focal length of a lens group disposed closest to the object side in the optical system.

3. The optical system according to claim 1, wherein the optical system satisfies the following conditional expression:

$$0.20 < f1/ft < 2.00$$

where
ft: overall focal length of the optical system in the telescopic state, and
f1: focal length of a lens group disposed closest to the object side in the optical system.

4. The optical system according to claim 1, wherein the optical system satisfies the following conditional expression:

$$0.30 < f1/fL1 < 1.50$$

where
fL1: focal length of a lens disposed closest to the object side in the optical system, and
f1: focal length of a lens group disposed closest to the object side in the optical system.

5. The optical system according to claim 1, wherein the optical system satisfies the following conditional expression:

$$0.40 < TLt/ft < 1.00$$

where
ft: overall focal length of the optical system in the telescopic state.

6. The optical system according to claim 1, further comprising an aperture stop, wherein the optical system satisfies the following conditional expression:

$$0.10 < (-flmt)/fObt < 0.60$$

where
fObt: combined focal length on the object side of the aperture stop of the optical system in the telescopic state, and
flmt: combined focal length on the image side of the aperture stop of the optical system in the telescopic state.

7. The optical system according to claim 1, further comprising a focusing lens group configured to move in an optical axis direction at focusing, wherein
the focusing lens group includes at least one negative lens, and
the optical system satisfies the following conditional expression:

$$60.00 < vdF$$

where
vdF: Abbe number of a medium of the negative lens of the focusing lens group at a d line.

8. The optical system according to claim 1, wherein the optical system satisfies the following conditional expression:

$$0.200 < fLPF/ft < 1.000$$

where
ft: overall focal length of the optical system in the telescopic state, and
fLPF: focal length of the diffraction lens.

9. The optical system according to claim 1, wherein the optical system satisfies the following conditional expression:

$$0.100 < fLPF/fA < 2.000$$

where
fA: focal length of the front lens group, and
fLPF: focal length of the diffraction lens.

10. The optical system according to claim 1, wherein the optical system the following conditional expression:

$$2.0E\text{-}5 < \phi D < 2.0E\text{-}4$$

where
φD: refractive power of the diffraction surface for a dominant wavelength.

11. The optical system according to claim 1, wherein the diffraction surface is disposed on the object side of a focusing lens group configured to move in an optical axis direction at focusing.

12. The optical system according to claim 1, wherein
the rear lens group includes an anti-vibration lens group configured to move with a displacement component in a direction perpendicular to the optical axis, and
the anti-vibration lens group includes at least one negative lens that satisfies the following conditional expression:

$$56.00 < vdVR$$

where
vdVR: Abbe number of a medium of the negative lens included in the anti-vibration lens group at a d line.

13. The optical system according to claim 1, wherein the rear lens group includes at least one negative lens that satisfies the following conditional expression:

$$0.655 < \theta gFr + 0.00168 \times vdr$$

where
θgFr: partial dispersion ratio of a medium of the negative lens included in the rear lens group, and
vdr: Abbe number of a medium of the negative lens included in the rear lens group at a d line.

14. The optical system according to claim 1, wherein the optical system satisfies the following conditional expression:

$$0.00° < 2\omega w < 24.00°$$

where
2ωw: full angle of view of the optical system in a wide-angle state.

15. The optical system according to claim 1, wherein the optical system satisfies the following conditional expression:

$$0.00° < 2\omega t < 10.00°$$

where
2ωt: full angle of view of the optical system in the telescopic state.

16. An optical apparatus comprising the optical system according to claim 1.

17. A method for manufacturing an optical system including a front lens group and a rear lens group, the front lens group including a diffraction lens having a diffraction surface, the rear lens group being disposed on an image side of the front lens group and including five lens groups, the method comprising:
disposing the front and rear lens groups so that a distance between the front and rear lens groups changes at magnification change and so that the diffraction surface is in contact with air;
disposing a final lens group that is closest to the image side and has negative refractive power so as to be fixed with respect to an image plane at magnification change; and
disposing the front and rear lens groups so that the following conditional expressions are satisfied:

$$0.130 < TLpf/TLt < 0.500, \text{ and}$$

$$Bfw/fw < 0.90$$

where
TLt: total optical length of the optical system in a telescopic state,
TLpf: distance on an optical axis from a lens surface closest to an object side in the optical system to the diffraction surface in the telescopic state,
fw: overall focal length of the optical system in a wide-angle state, and
Bfw: back focus of the optical system in the wide-angle state.

* * * * *